US009637161B2

(12) United States Patent
Orihara et al.

(10) Patent No.: US 9,637,161 B2
(45) Date of Patent: May 2, 2017

(54) STEERING DEVICE

(71) Applicant: NSK LTD., Tokyo (JP)

(72) Inventors: Daiki Orihara, Gunma (JP); Masaya Johta, Gunma (JP); Hiroshi Kakita, Gunma (JP); Osamu Kurihara, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/109,168

(22) PCT Filed: Aug. 10, 2015

(86) PCT No.: PCT/JP2015/072643
§ 371 (c)(1),
(2) Date: Jun. 30, 2016

(87) PCT Pub. No.: WO2016/035515
PCT Pub. Date: Mar. 10, 2016

(65) Prior Publication Data
US 2016/0355208 A1 Dec. 8, 2016

(30) Foreign Application Priority Data

Sep. 2, 2014 (JP) ................................. 2014-178004

(51) Int. Cl.
*B62D 1/185* (2006.01)
*B62D 1/19* (2006.01)
(52) U.S. Cl.
CPC ............. *B62D 1/195* (2013.01); *B62D 1/185* (2013.01); *B62D 1/19* (2013.01)

(58) Field of Classification Search
CPC .......... B62D 1/185; B62D 1/19; B62D 1/192; B62D 1/195
See application file for complete search history.

(56) References Cited

U.S. PATENT DOCUMENTS 3,670,591 A * 6/1972 Milton ................... B62D 1/192
74/492
3,703,105 A * 11/1972 Milton ................... B62D 1/192
403/106
(Continued)

FOREIGN PATENT DOCUMENTS

DE 102014200933 A1 * 8/2014 ............. B62D 1/185
JP 61-31968 U 2/1986
(Continued)

OTHER PUBLICATIONS

International Search Report for PCT/JP2015/072643 dated Sep. 8, 2015.

*Primary Examiner* — Laura Freedman
(74) *Attorney, Agent, or Firm* — Sughrue Mion, PLLC

(57) ABSTRACT

A steering device includes an inner column, an outer column, an outer column bracket, an inner column bracket, a shear pin, and a damper. A first hole is formed in the inner column. The outer column has a slit formed by notching one end. The outer column bracket tightens the outer column together with a telescopic friction plate. The inner column bracket is supported by the telescopic friction plate, and has a second hole. The shear pin detachably connects the inner column and the inner column bracket to each other at a position across the first hole and the second hole. The damper faces an internal end portion wall of the slit in an axial direction of the inner column.

5 Claims, 16 Drawing Sheets

(56) References Cited

U.S. PATENT DOCUMENTS

| | | | | |
|---|---|---|---|---|
| 4,627,306 A * | 12/1986 | Berenjian | ............... | B62D 1/195 188/371 |
| 5,259,818 A * | 11/1993 | Kachi | ................... | B62D 1/192 280/777 |
| 6,339,970 B1 * | 1/2002 | Blex | ...................... | B62D 1/192 188/371 |
| 7,410,190 B2 * | 8/2008 | Sawada | ................... | B62D 1/19 180/427 |
| 7,441,807 B2 * | 10/2008 | Yoshimoto | ............ | B62D 1/192 280/777 |
| 7,905,518 B2 * | 3/2011 | Geibel | .................. | B62D 1/192 280/777 |
| 8,627,742 B2 * | 1/2014 | Ridgway | ............... | B62D 1/192 280/777 |
| 8,931,804 B2 * | 1/2015 | Yamamoto | ............. | B62D 1/184 280/775 |
| 9,381,935 B2 * | 7/2016 | Ishimura | ................ | B60R 25/02 |
| 9,409,590 B2 * | 8/2016 | Johta | ...................... | B62D 1/184 |
| 9,409,591 B2 * | 8/2016 | Johta | ...................... | B62D 1/184 |
| 9,415,795 B2 * | 8/2016 | Hagiwara | ............. | B62D 1/184 |
| 9,415,796 B2 * | 8/2016 | Hagiwara | ............. | B62D 1/184 |
| 9,421,995 B2 * | 8/2016 | Johta | ...................... | B62D 1/184 |
| 9,434,403 B2 * | 9/2016 | Johta | ...................... | B62D 1/184 |
| 2002/0157494 A1 | 10/2002 | Matsumoto et al. | | |
| 2008/0023952 A1 * | 1/2008 | Manwaring | ........... | B62D 1/195 280/777 |
| 2016/0244087 A1 * | 8/2016 | Sakuda | ................. | B62D 1/184 |
| 2016/0272235 A1 * | 9/2016 | Takahashi | ............. | B62D 1/184 |
| 2016/0297464 A1 * | 10/2016 | Johta | ..................... | B62D 1/184 |

FOREIGN PATENT DOCUMENTS

| | | | |
|---|---|---|---|
| JP | 2001-208089 A | | 8/2001 |
| JP | 2007-69800 A | | 3/2007 |
| JP | 2008024243 A | * | 2/2008 |
| JP | 2012250651 A | * | 12/2012 |
| JP | 2014-136500 A | | 7/2014 |

* cited by examiner

STEERING DEVICE

CROSS REFERENCE TO RELATED APPLICATIONS

This application is a National Stage of International Application No. PCT/JP2015/072643 filed Aug. 10, 2015, claiming priority based on Japanese Patent Application No. 2014-178004 filed Sep. 2, 2014, the contents of all of which are incorporated herein by reference in their entirety.

BACKGROUND OF THE INVENTION

1. Field of the Invention

The present invention relates to a steering device.

2. Description of the Related Art

A technology using a capsule has been known as a support structure of a steering device which applies a rudder angle to a wheel with rotation of a steering wheel. For example, Prior Art 1 describes a technology in which, when an excessive load is applied to a steering column attached to a vehicle body through a capsule and accordingly the steering column is pressed to a front of the vehicle body, a portion of the capsule is cut such that the steering column moves to the front of the vehicle body, thereby protecting a driver (operator) from the steering wheel which is pushed up (secondary collision).

CITATION LIST

Prior Art

Prior Art 1: JP 2007-69800 A

When a steering column is attached to a vehicle body through a capsule as in the technology described in Prior Art 1, the steering column falls upon cutting of the capsule. For this reason, when a set value of a separation load at which the steering column moves to a front of a vehicle is lowered in order to protect an operator who has a light weight from a secondary collision, the steering column is likely to fall due to a malfunction. When the steering column falls due to the malfunction, there is difficulty in performing a steering operation thereafter. For this reason, there has been difficulty in lowering the set value of the separation load.

In view of the above-mentioned problem, an object of the invention is to provide a steering device capable of inhibiting a steering column from falling due to a malfunction even after lowering a set value of a separation load at which the steering column moves to a front of a vehicle body.

SUMMARY OF THE INVENTION

It is an object of the present invention to at least partially solve the problems in the conventional technology. According to an aspect of the invention, A steering device comprising: a cylindrical inner column that rotatably supporting an input shaft connected to a steering wheel and has a first hole opened therein; an outer column that has a cylindrical shape into which at least a portion of the inner column is inserted and has a slit formed by notching one end of the outer column into which the inner column is inserted; an outer column bracket that is fixed to a vehicle body-side member, and supports the outer column, and tightens the outer column together with a telescopic friction plate corresponding to a plate material; an inner column bracket that is supported by the telescopic friction plate and has a second hole opened therein; a shear pin that is located at a position across the first hole and the second hole and detachably connects the inner column and the inner column bracket to each other; and a damper that is attached to the inner column bracket and faces an internal end portion wall corresponding to an internal wall of an end portion of the slit in an axial direction of the inner column.

Accordingly, in the steering device according to the invention, when an excessive load is applied to the steering wheel, the load is transferred to the inner column through the input shaft, thereby moving the inner column forward. On the other hand, the inner column bracket supported by the telescopic friction plate does not move. For this reason, a shear force is applied to the shear pin. Thus, when the load exceeds an allowed shear force of the shear pin, the shear pin is cut. When the shear pin is cut, connection between the inner column and the inner column bracket is released. When connection between the inner column and the inner column bracket is released, the inner column is supported in the axial direction by a frictional force generated between the inner column and the outer column. For this reason, the inner column which is included in a steering column may move to a front of a vehicle body. In addition, even when the shear pin is cut, the outer column is continuously supported by the outer column bracket which is fixed to the vehicle body-side member. Further, the inner column is continuously supported by the outer column. For this reason, even when the shear pin is cut, the steering column does not fall. Therefore, even when a set value of a separation load at which the steering column moves to the front of the vehicle body is lowered, the steering device according to the present invention may suppress falling of the steering column due to a malfunction.

Further, when a telescopic position becomes a forefront at the time of performing a telescopic adjustment after operating an operating lever, the damper comes into contact with the internal end portion wall of the slit. When a force is applied to the inner column in a state in which the damper comes into contact with the internal end portion wall, a reaction force from the internal end portion wall is applied to the damper. Accordingly, the damper is elastically deformed, and thus a portion of the force applied to the damper is consumed to elastically deform the damper. In addition, a force smaller than the force applied to the damper is transmitted to the inner column bracket, and a shear force having a magnitude substantially equivalent to that of the force transmitted to the inner column bracket is applied to the shear pin. For this reason, the shear force applied to the shear pin becomes smaller than the force applied to the inner column. Therefore, the steering device according to the present invention may suppress cutting of the shear pin at the time of performing the telescopic adjustment, and protect a separation mechanism.

As a preferred aspect of the invention, when a force greater than or equal to the allowed shear force of the shear pin is applied to the inner column, the damper preferably decreases a force transmitted to the shear pin to be less than the allowed shear force.

Accordingly, even when the damper collides with the internal end portion wall of the slit at a force greater than the allowed shear force of the shear pin at the time of performing the telescopic adjustment, the steering device may suppress cutting of the shear pin.

As a preferred aspect of the invention, the inner column bracket includes a through-hole penetrating through the inner column bracket in the radial direction of the inner column, and the damper includes a base portion facing the internal end portion wall, and a locking portion protruding from the base portion and penetrating through the through-hole.

Accordingly, a direction of a force applied to the damper at the time of the telescopic adjustment is different from a direction in which the damper is locked with respect to the inner column bracket. For this reason, even when a force is repeatedly applied to the damper, the locking portion is less likely to wear. Since a gap is less likely to be generated between the locking portion and the through-hole, the locking portion is less likely to fall out of the inner column bracket. Therefore, the steering device may make the damper less likely to fall out of the inner column bracket.

As a preferred aspect of the invention, the damper includes a base portion facing the internal end portion wall, and a plurality of protrusions protruding from the base portion in the axial direction of the inner column.

Accordingly, a gap is generated between the protrusions. For this reason, when the damper comes into contact with the internal end portion wall of the slit, the protrusions are more easily and elastically deformed as compared to the base portion. That is, a spring constant of the protrusions as an elastic body is smaller than that of the base portion. In this way, when the damper includes the protrusions, the spring constant of which is small, a spring constant of the whole damper easily becomes a value preferable to suppress cutting of the shear pin. That is, an impact absorbing capability of the damper is improved. Therefore, the steering device more easily suppresses cutting of the shear pin at the time of performing the telescopic adjustment.

As a preferred aspect of the invention, the inner column bracket is disposed on a lower side of a vehicle body with respect to the inner column, and includes a notch portion formed by notching a surface facing the inner column, and the damper is disposed in the notch portion.

Accordingly, the damper is received in the notch portion, and thus a device formed by integrating the inner column bracket and the damper is miniaturized. In addition, the damper is placed above the inner column bracket, and thus separation of the damper from the inner column bracket is suppressed.

As a preferred aspect of the invention, the damper is synthetic rubber.

Synthetic rubber is a high-elastic material, and thus an elastic limit of the damper becomes larger. For this reason, even when a force is repeatedly applied to the damper, plastic deformation is less likely to occur in the damper. Therefore, the steering device may suppress a possibility that a telescopic forefront position will be shifted from a predetermined position due to plastic deformation of the damper.

According to the present invention, it is possible to provide a steering device capable of inhibiting a steering column from falling due to a malfunction even when a set value of a separation load at which the steering column moves to a front of a vehicle body is lowered.

DETAILED DESCRIPTION OF THE PREFERRED EMBODIMENT

A detailed description will be given of an embodiment of the present invention with reference to drawings. The invention is not restricted by content described in the embodiment below. In addition, components described below include a component that is easily presumable by those skilled in the art and components that are substantially the same. Further, the components described below may be appropriately combined.

Embodiment

Figure 1:
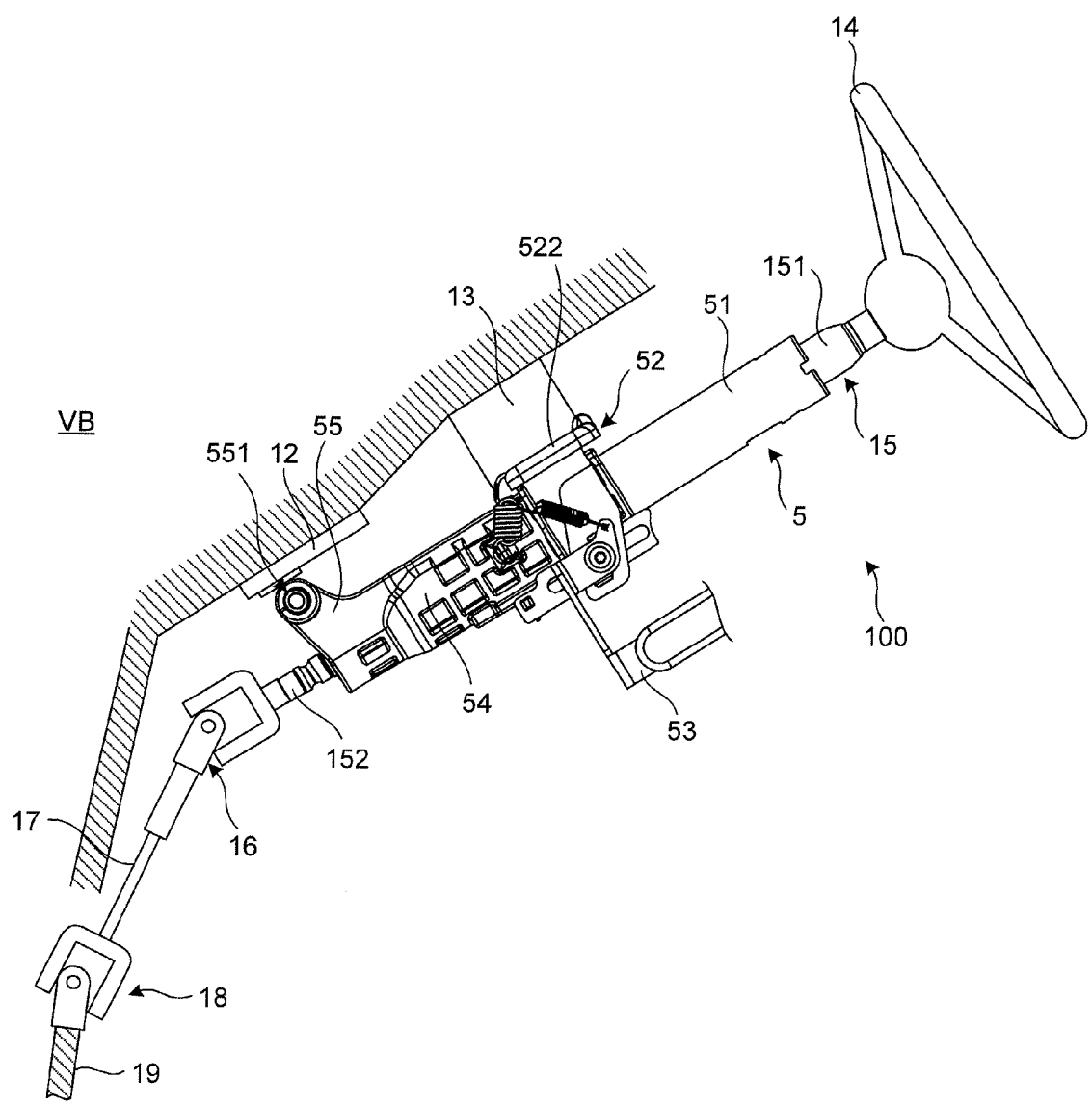
FIG. 1 is a diagram schematically illustrating a portion around a steering device according to the present embodiment.
Figure 2:
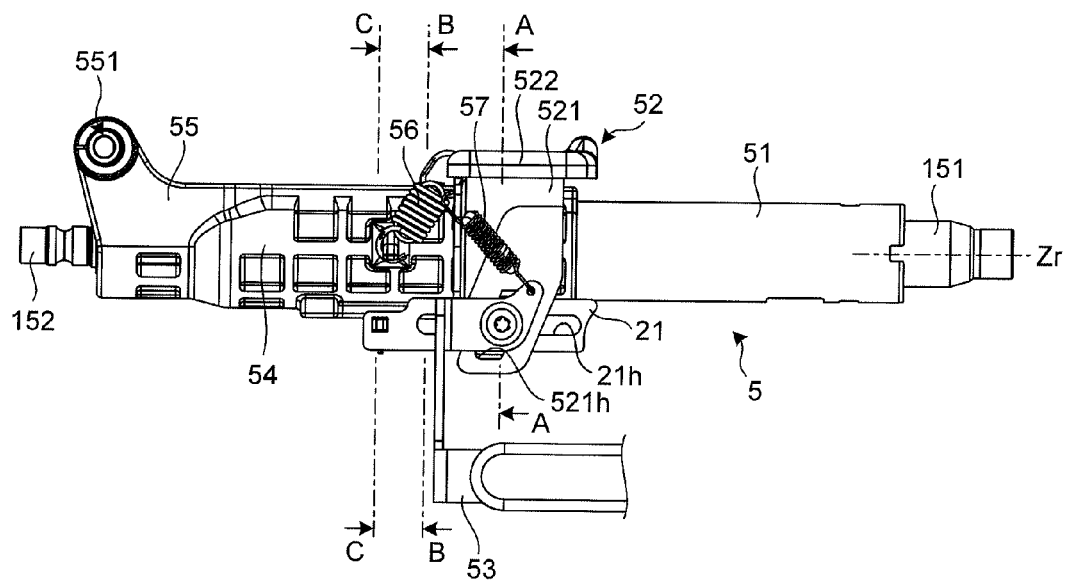
FIG. 2 is a side view of the steering device according to the present embodiment.
Figure 3:
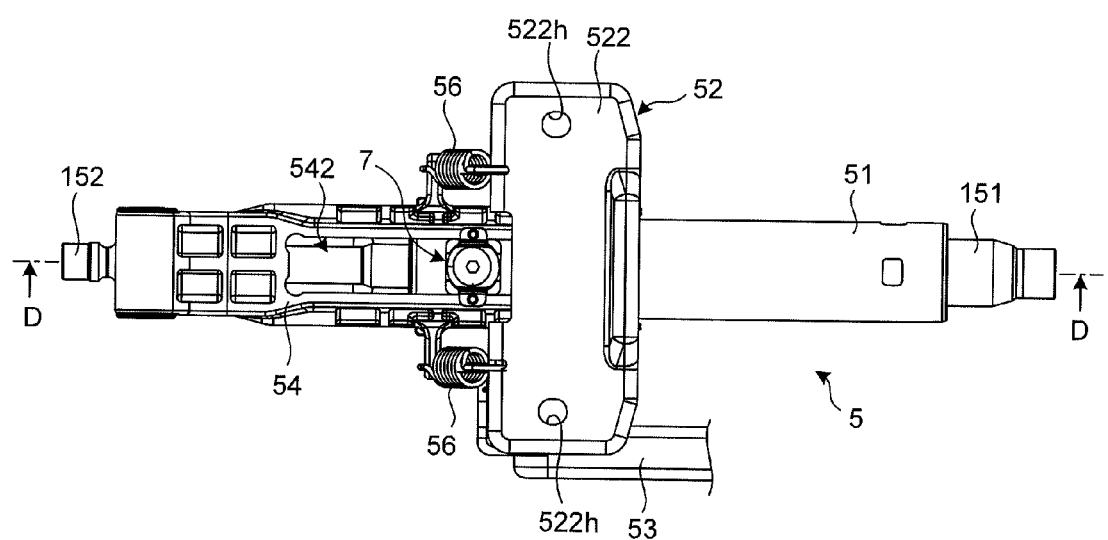
FIG. 3 is a plan view of the steering device according to the present embodiment.
Figure 4:
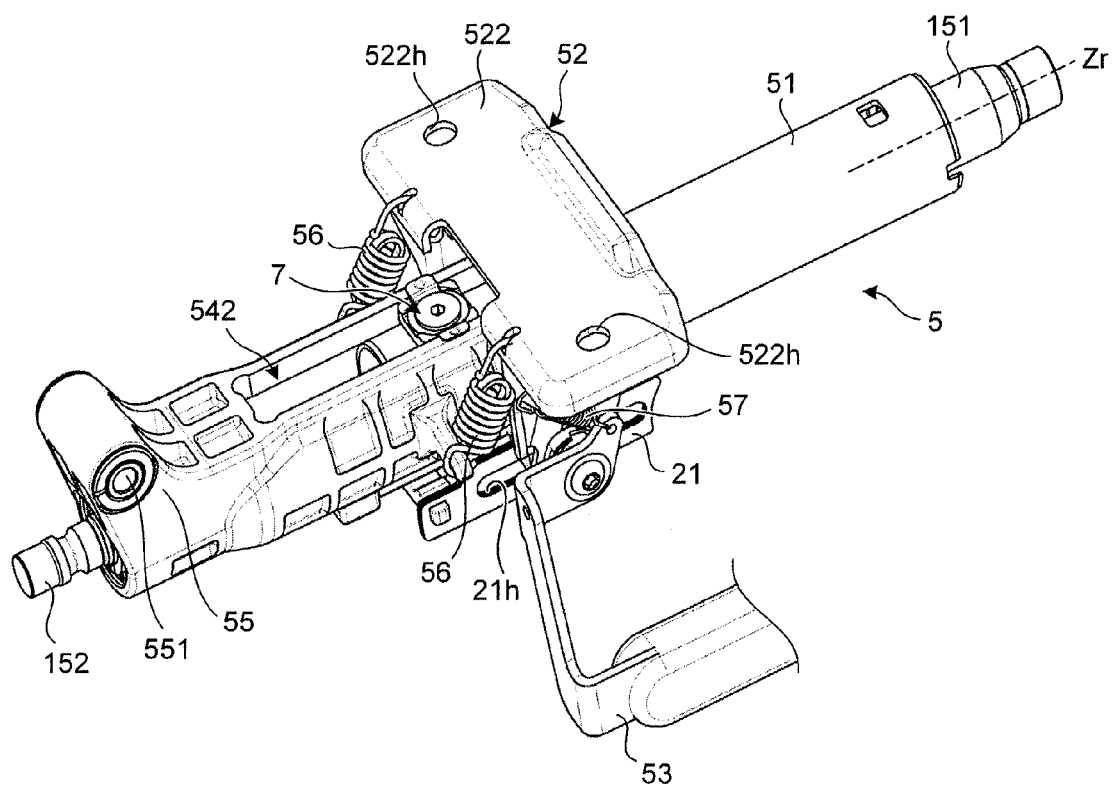
FIG. 4 is a perspective view of the steering device according to the present embodiment when viewed from an upper side of a vehicle body.

FIG. 1 is a diagram schematically illustrating a portion around a steering device according to the present embodiment. FIG. 2 is a side view of the steering device according to the present embodiment. FIG. 3 is a plan view of the steering device according to the present embodiment. FIG. 4 is a perspective view of the steering device according to the present embodiment when viewed from an upper side of a vehicle body. In description below, a front of a vehicle body VB corresponding to a case in which a steering device 100 is attached to the vehicle body VB is simply described as a front, and a rear of the vehicle body VB corresponding to a case in which the steering device 100 is attached to the vehicle body VB is simply described as a rear. In addition, an upper portion of the vehicle body VB corresponding to a case in which the steering device 100 is attached to the vehicle body VB is simply described as an upper portion, and a lower portion of the vehicle body VB corresponding to a case in which the steering device 100 is attached to the vehicle body VB is simply described as a lower portion. Referring to FIG. 1, a left side of the figure is the front, a right side of the figure is the rear, an upper side of the figure is the upper portion, and a lower side of the figure is the lower portion.

(Steering Device)

The steering device 100 includes a steering wheel 14, a steering shaft 15, a universal joint 16, a lower shaft 17, and a universal joint 18 in an order in which a force applied from an operator is transmitted, and is joined to a pinion shaft 19.

The steering shaft 15 includes an input shaft 151 and an output shaft 152. Referring to the input shaft 151, one end portion is connected to the steering wheel 14, and the other end portion is connected to the output shaft 152. For example, a resin coating is applied to a surface of the input shaft 151. Accordingly, the input shaft 151 is connected to the output shaft 152 through resin. Referring to the output shaft 152, one end portion is connected to the input shaft 151, and the other end portion is connected to the universal joint 16. In the present embodiment, the input shaft 151 and the output shaft 152 are formed using a general steel material such as carbon steel for machine structural use (so-called SC material) or a carbon steel pipe for machine structural use (so-called STKM material).

Referring to the lower shaft 17, one end portion is connected to the universal joint 16, and the other end portion is connected to the universal joint 18. One end portion of the pinion shaft 19 is connected to the universal joint 18.

In addition, the steering device 100 includes a steering column 5 which includes a cylindrical inner column 51 that supports the input shaft 151 rotatably about a central axis of rotation Zr, and a cylindrical outer column 54 into which at least a portion of the inner column 51 is inserted. The inner column 51 is disposed on the rear side relative to the outer column 54.

The steering device 100 includes an outer column bracket 52 which is fixed by a vehicle body-side member 13 to support the outer column 54. The outer column bracket 52 includes a mounting plate 522 fixed to the vehicle body-side member 13, and frame-shaped supports 521 formed integrally with the mounting plate 522. As illustrated in FIG. 3 and FIG. 4, the mounting plate 522 of the outer column bracket 52 has a mounting hole 522h, and is fixed to the vehicle body-side member 13 using fixing members such as the mounting hole 522h and a bolt. The frame-shaped supports 521 of the outer column bracket 52 are disposed on both sides of the outer column 54 to tighten the outer column 54. In addition, tilt adjusting holes 521h corresponding to elongated holes which are long in a top-down direction of the vehicle body VB, are provided in the frame-shaped supports 521.

Further, the outer column 54 includes a pivot bracket 55 which is provided in a front side-end portion. The pivot bracket 55 is rotatably supported by a vehicle body-side member 12 about a rotating shaft 551. For example, the rotating shaft 551 is parallel to a horizontal direction. Accordingly, the outer column 54 is supported to oscillate in a vertical direction.

Figure 5:
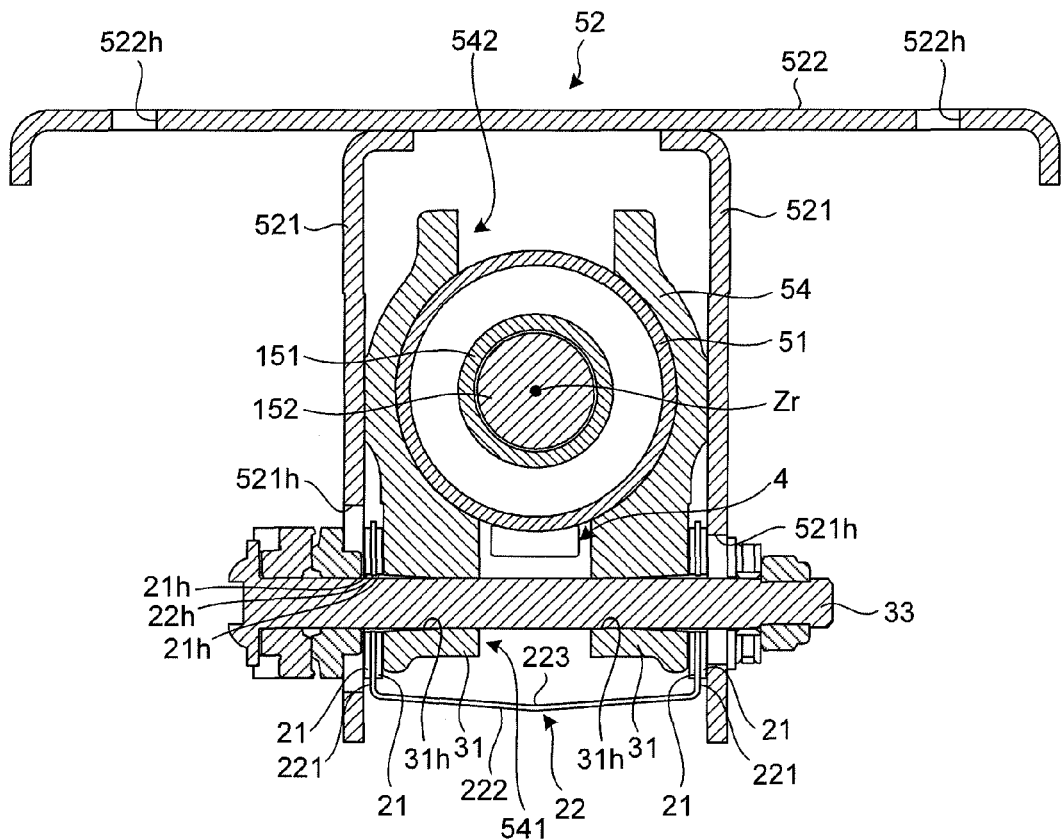
FIG. 5 is a cross-sectional view taken along line A-A of FIG. 2.

FIG. 5 is a cross-sectional view taken along line A-A of FIG. 2. As illustrated in FIG. 5, the outer column 54 includes two rod penetrating portions 31, a first slit 541, and a second slit 542. For example, the rod penetrating portion 31 is a portion protruding downward from an external wall of the inner column 51, and has a rod through-hole 31h which is a round hole. The respective rod through-holes 31h included in the two rod penetrating portions 31 face each other with the first slit 541 interposed therebetween. In addition, portions of the rod penetrating portions 31 face the frame-shaped supports 521. A rod 33 penetrates through the two rod through-holes 31h, and penetrates through the tilt adjusting holes 521h of the frame-shaped supports 521. Further, the rod 33 is connected to an operating lever 53.

The first slit 541 is an elongated hole formed by notching one end of the outer column 54 on an insertion side of the inner column 51. The first slit 541 is provided at a position between the two rod penetrating portions 31. The outer column 54 has the first slit 541, and thus an inner diameter of the outer column 54 decreases when the outer column 54 is tightened. Accordingly, while the outer column 54 is tightened, an internal wall of the outer column 54 is in contact with the external wall of the inner column 51 in a portion in which the outer column 54 covers the inner column 51. For this reason, a frictional force is generated between the outer column 54 and the inner column 51. For example, in the present embodiment, a coating by a friction-reducing material for reducing friction between the outer column 54 and the inner column 51 is applied to the external wall of the inner column 51.

As illustrated in FIG. 5, the steering device 100 includes a first telescopic friction plate 21 and a second telescopic friction plate 22 to strengthen a tightening holding force with respect to the steering column 5. The first telescopic friction plate 21 is a plate-shaped member that has a telescopic adjustment hole 21h which is an elongated hole having its longitudinal direction in an axial direction. For example, two first telescopic friction plates 21 are disposed to overlap each other at respective positions between the frame-shaped supports 521 and the rod penetrating portions 31. For example, the second telescopic friction plate 22 is a member formed by bending a plate material, and has a substantially U shape when viewed from a direction of the central axis of rotation Zr. The second telescopic friction plate 22 includes two friction portions 221 disposed between the two first telescopic friction plates 21, a connecting portion 222 that connects the two friction portions 221, and a bent portion 223 provided in the connecting portion 222.

The first telescopic friction plates 21 may not necessarily be disposed at the positions between the frame-shaped supports 521 and the rod penetrating portions 31. For example, the first telescopic friction plates 21 may be disposed outside the frame-shaped supports 521. That is, the first telescopic friction plates 21 may be disposed on opposite sides from the rod penetrating portions 31 with the frame-shaped supports 521 interposed therebetween.

The friction portion 221 have rod a through-hole 22h which is a round hole. The rod 33 penetrates the telescopic adjustment holes 21h and the rod through-holes 22h. The connecting portion 222 connects and integrates the two friction portions 221, and thus disposing the friction portions 221 between the two first telescopic friction plates 21 becomes easier. In addition, as the connecting portion 222 has the bent portion 223, a bent state may be maintained. Accordingly, even when a distance between the two friction portions 221 changes as a result of a change in a tightening state of the outer column bracket 52, the connecting portion 222 is less likely to pull the friction portions 221. For this reason, a possibility of generating gaps between the friction portions 221 and the first telescopic friction plates 21 due to the friction portions 221 pulled by the connecting portion 222 is suppressed.

When the frame-shaped supports 521 are tightened, the first telescopic friction plates 21 and the friction portions 221 of the second telescopic friction plate 22 are pressed against the rod penetrating portions 31 of the outer column 54 by the frame-shaped supports 521. Accordingly, frictional forces are generated between the frame-shaped supports 521 and the first telescopic friction plates 21, between the first telescopic friction plates 21 and the friction portions 221 of the second telescopic friction plate 22, and between the first telescopic friction plates 21 and the rod penetrating portions 31. For this reason, an area in which a frictional force is generated increases as compared to a case in which the first telescopic friction plates 21 and the second telescopic friction plate 22 are not present. The frame-shaped supports 521 may strongly tighten the outer column 54 by the first telescopic friction plates 21 and the second telescopic friction plate 22.

When the operating lever 53 is rotated, a tightening force with respect to the frame-shaped supports 521 is mitigated, and a frictional force between the frame-shaped supports 521 and the outer column 54 is eliminated or becomes small. Accordingly, a tilt position of the outer column 54 can be adjusted. In the present embodiment, as illustrated in FIG. 4, the steering device 100 includes a first spring 56 and a second spring 57. For example, the first spring 56 and the second spring 57 are coil springs. One end of the first spring 56 is attached to the mounting plate 522, and the other end of the first spring 56 is attached to the outer column 54. The first spring 56 assists the steering column 5 in moving up and down at the time of tilt adjustment, and suppresses falling of the steering column 5. One end of the second spring 57 is attached to the mounting plate 522, and the other end of the second spring 57 is attached to the operating lever 53. The second spring 57 applies a pre-load to the rod 33 through the operating lever 53. Specifically, the second spring 57 applies the pre-load in a direction that intersects a longitudinal direction of the tilt adjusting holes 521h to the rod 33. Accordingly, a wobble of the rod 33 is suppressed at the time of tilt adjustment.

In addition, when the operating lever 53 is rotated, a tightening force with respect to the frame-shaped supports 521 is mitigated, a width of the first slit 541 of the outer column 54 increases. Accordingly, a force at which the outer column 54 tightens the inner column 51 is eliminated, and thus a frictional force generated when the inner column 51 slides is eliminated. Accordingly, the operator may adjust a telescopic position by pushing and pulling the inner column 51 through the steering wheel 14 after rotating the operating lever 53.

Figure 6:
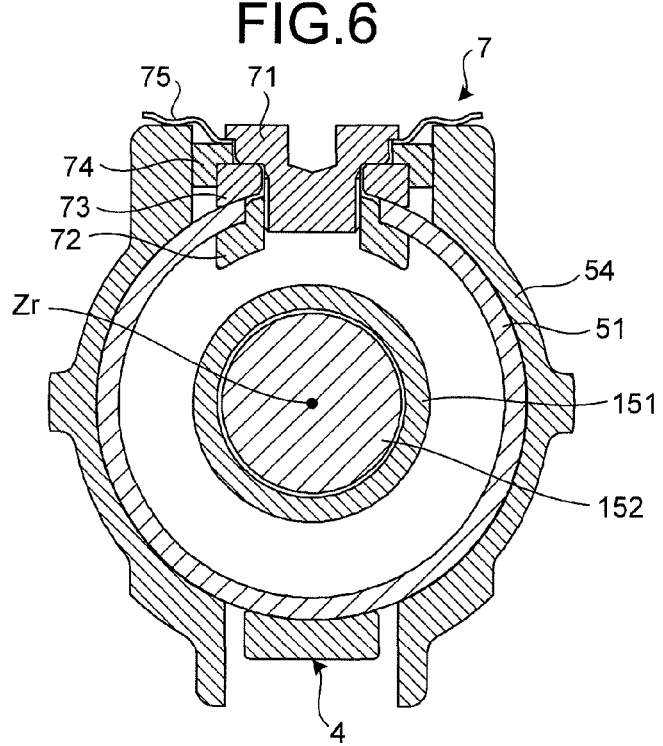
FIG. 6 is a cross-sectional view taken along line B-B of FIG. 2.
Figure 7:
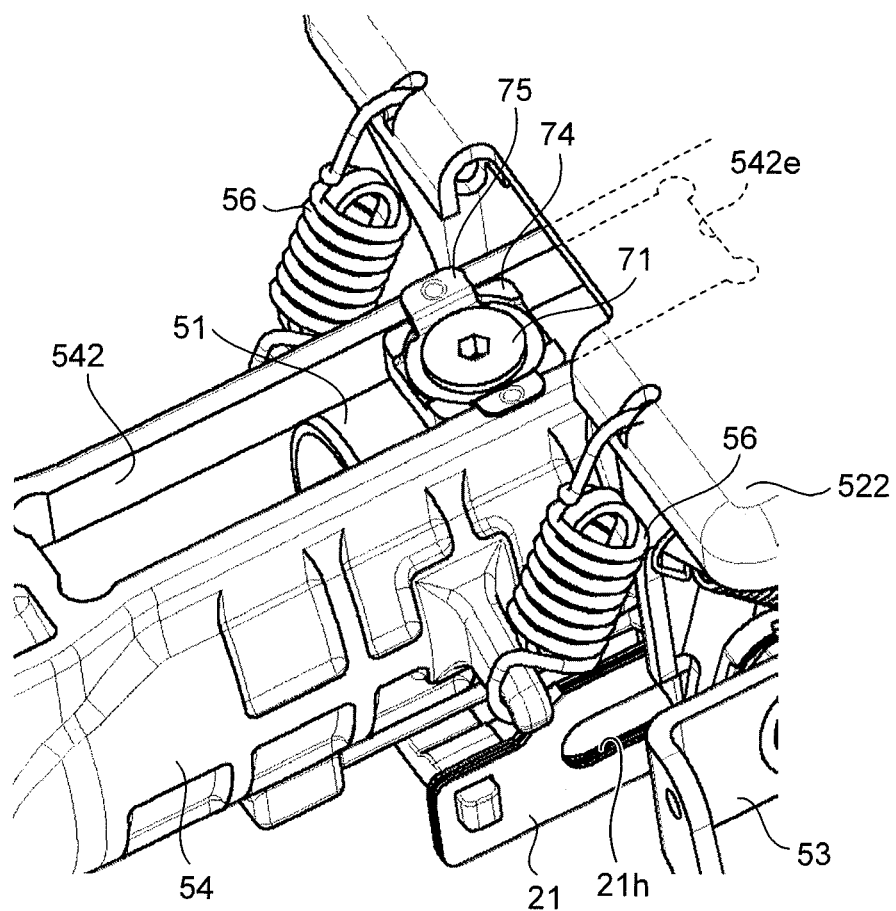
FIG. 7 is an enlarged view illustrating a portion around a stopper of FIG. 4.

FIG. 6 is a cross-sectional view taken along line B-B of FIG. 2. FIG. 7 is an enlarged view illustrating a portion around a stopper of FIG. 4. As illustrated in FIG. 6 and FIG. 7, the steering device 100 includes a stopper 7. The stopper 7 is attached to a position at which the inner column 51 is exposed through the second slit 542.

For example, the stopper 7 includes a bolt 71, a backing plate 72, a washer 73, a spacer 74, and a conducting plate 75. The backing plate 72 is a plate-shaped member made of metal which includes a cylindrical protrusion. The cylindrical protrusion of the backing plate 72 is fit into a through-hole provided at the position at which the inner column 51 is exposed through the second slit 542 from an inside of the inner column 51. The backing plate 72 has a female screw on an internal wall of the cylindrical protrusion. The bolt 71 is fastened to the female screw of the backing plate 72. The washer 73 is disposed between a bolt head of the bolt 71 and the backing plate 72. A bottom face of the washer 73 has a shape that fits to a shape of the external wall of the inner column 51. Accordingly, an attitude of the bolt 71 is stable. The spacer 74 is a member for filling a gap between an internal wall of the second slit 542 and the bolt 71 and a gap between the internal wall of the second slit 542 and the backing plate 72. For example, the spacer 74 is a member made of resin and has a through-hole. The bolt 71 and the backing plate 72 are disposed inside the through-hole of the spacer 74. For example, the conducting plate 75 is a plate-shaped member made of metal. For example, the conducting plate 75 is fixed by being sandwiched between the head of the bolt 71 and the spacer 74, and comes into contact with the outer column 54. Accordingly, the inner column 51 and the outer column 54 are in a conducting state through the backing plate 72, the bolt 71, and the conducting plate 75. In the present embodiment, for example, when a body ground is performed for a horn, electricity needs to be run from the input shaft 151 to the vehicle body VB. However, since the input shaft 151 is connected to the output shaft 152 through the resin coating, electricity does not flow from the input shaft 151 to the output shaft 152. In addition, since the coating by the friction-reducing material is applied to the external wall of the inner column 51, electricity does not flow from the external wall of the inner column 51 to the outer column 54. Therefore, in the present embodiment, the stopper 7 has a function of running electricity, which is transmitted from the input shaft 151 to the inner column 51, to the outer column 54.

The stopper 7 is attached to the inner column 51, and may slide while facing the internal wall of the second slit 542 when a telescopic adjustment is performed. Since the spacer 74 is made of resin, the stopper 7 smoothly slides with respect to the second slit 542. The stopper 7 regulates an adjustment range of a telescopic position by coming into contact with a second internal end portion wall 542e corresponding to a rear-side end portion of the second slit 542 when the telescopic position is adjusted. In addition, since the spacer 74 comes into contact with the internal wall of the second slit 542, the stopper 7 suppresses rotation of the inner column 51 about the central axis of rotation Zr.

Figure 8:
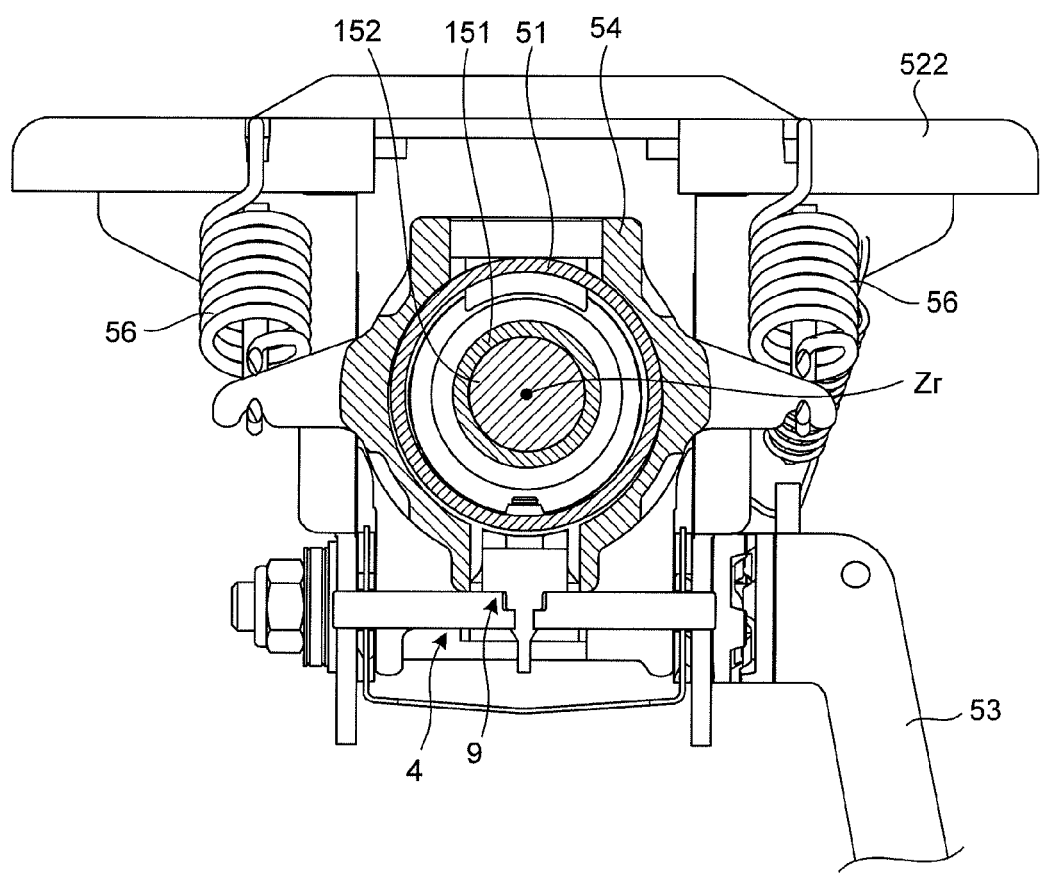
FIG. 8 is a cross-sectional view taken along line C-C of FIG. 2.
Figure 9:
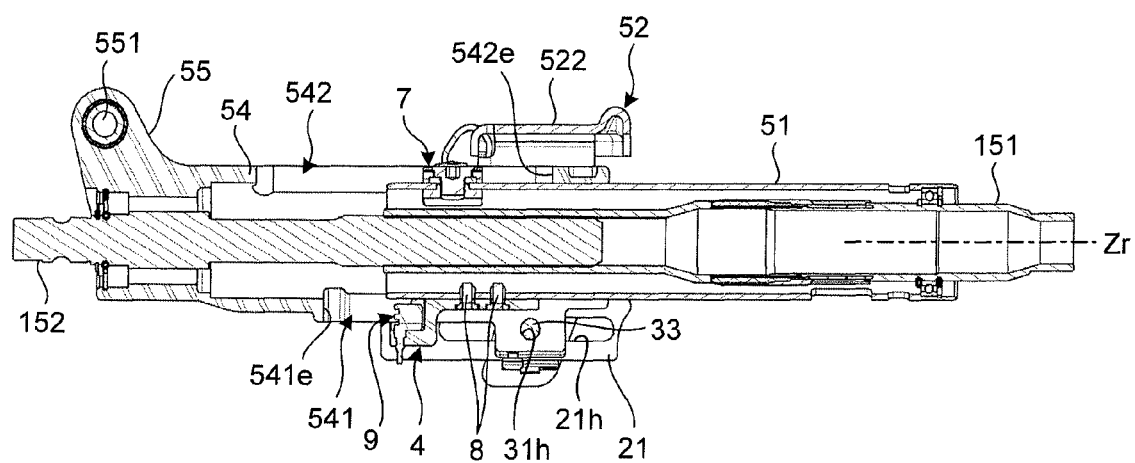
FIG. 9 is a cross-sectional view taken along line D-D of FIG. 3.
Figure 10:
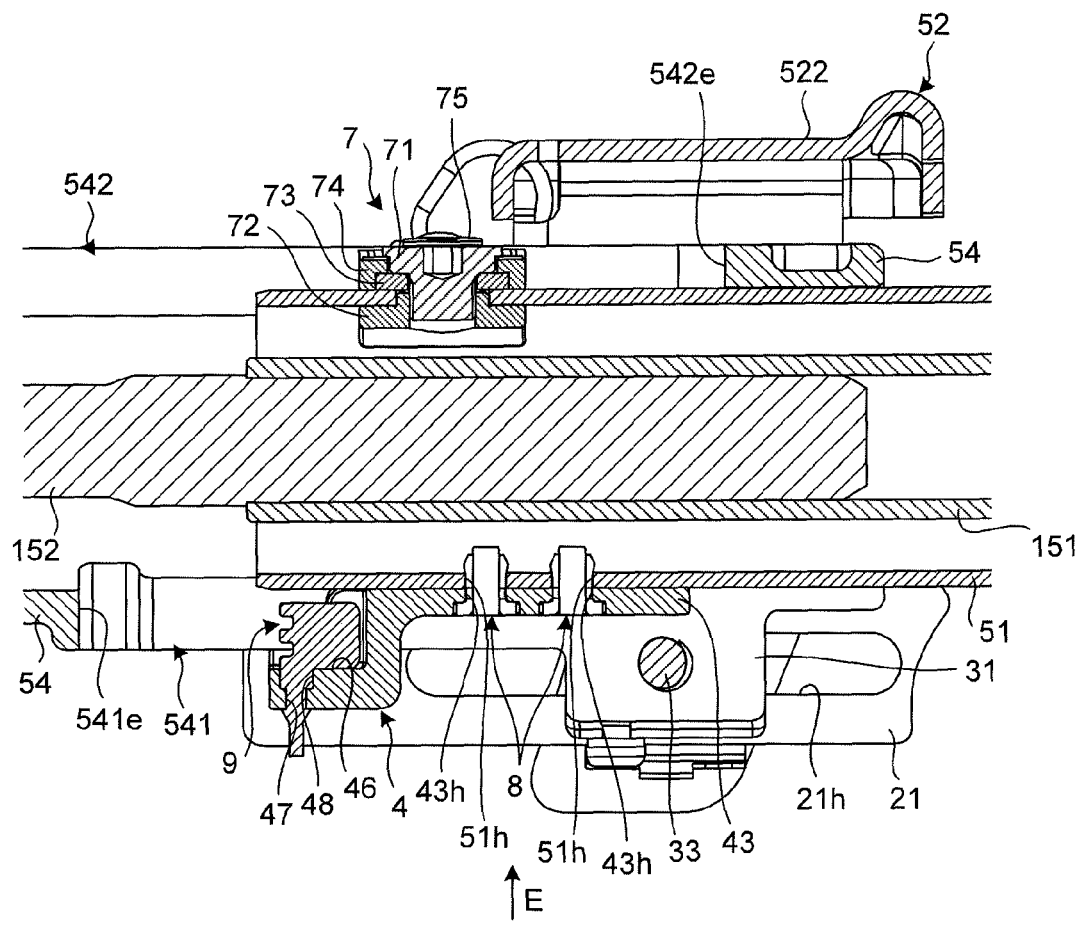
FIG. 10 is an enlarged view illustrating a portion around an inner column bracket of FIG. 9.
Figure 11:
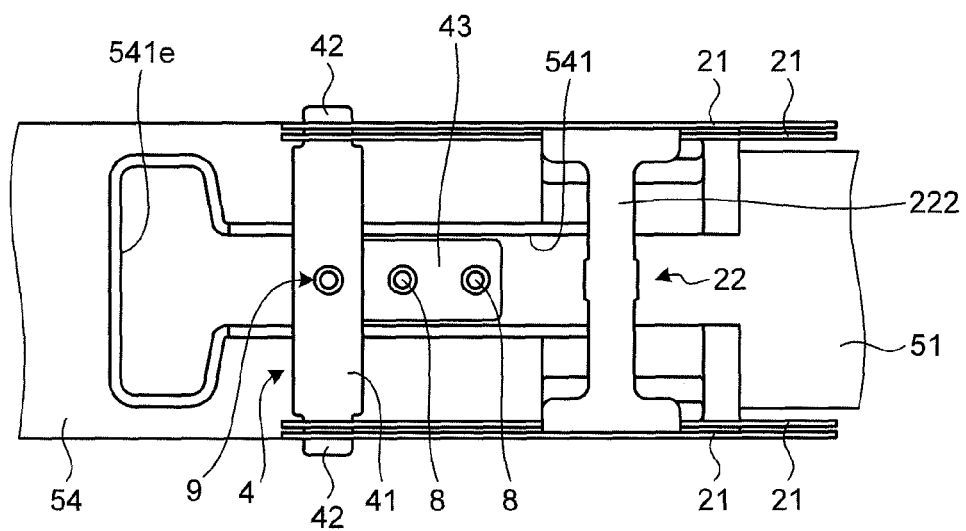
FIG. 11 is a diagram in a direction of an arrow E of FIG. 10.
Figure 12:
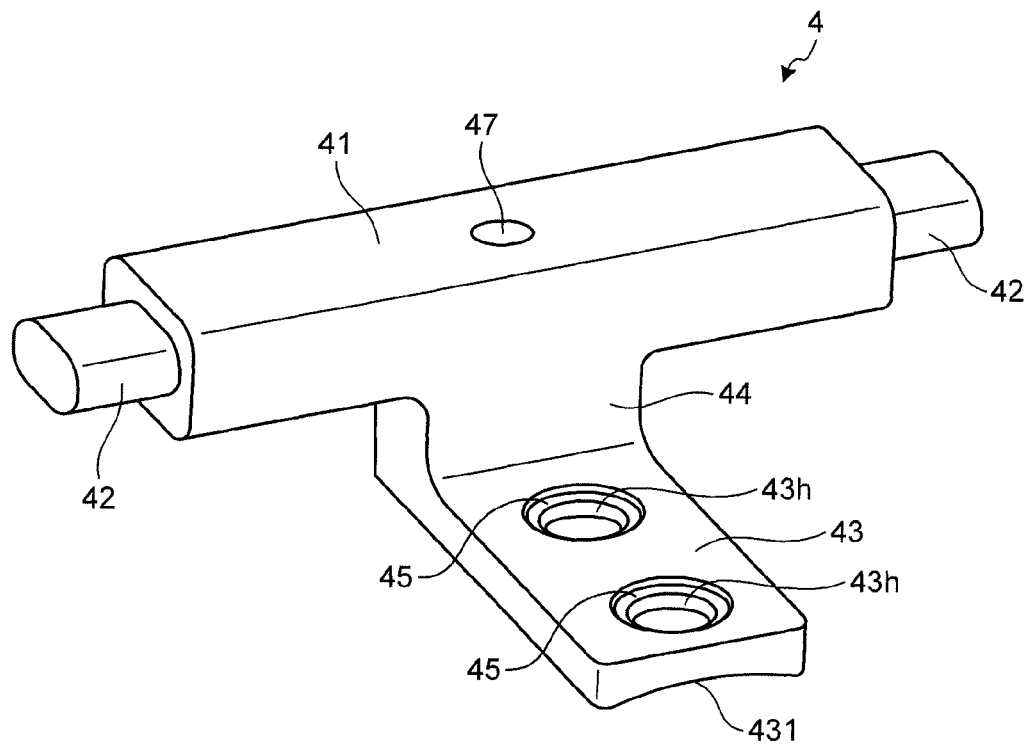
FIG. 12 is a perspective view of the inner column bracket according to the present embodiment.

FIG. 8 is a cross-sectional view taken along line C-C of FIG. 2. FIG. 9 is a cross-sectional view taken along line D-D of FIG. 3. FIG. 10 is an enlarged view illustrating a portion around an inner column bracket of FIG. 9. FIG. 11 is a diagram in a direction of an arrow E of FIG. 10. FIG. 12 is a perspective view of the inner column bracket according to the present embodiment. For example, the steering device 100 includes an inner column bracket 4 which is formed using metal such as an aluminum alloy or a steel material. For example, as illustrated in FIG. 10, the inner column bracket 4 is disposed below the inner column 51. As illustrated in FIG. 12, for example, the inner column bracket 4 includes an arm portion 41, insertion portions 42, a head portion 44, and a leg portion 43. As illustrated in FIG. 11, the arm portion 41 is a rod-shaped portion that connects the two pairs of first telescopic friction plates 21 facing each other on the both sides of the outer column 54. The insertion portions 42 are portions provided at both ends of the arm portion 41 and inserted into holes provided in the first telescopic friction plates 21. The insertion portions 42 are formed to be thinner than the arm portion 41. The head portion 44 is a portion that protrudes in a direction orthogonal to a longitudinal direction of the arm portion 41 from a portion of the arm portion 41. The leg portion 43 is a plate-shaped portion provided in an end portion of the head portion 44 on an opposite side from the arm portion 41, and is in contact with the inner column 51. As illustrated in FIG. 12, an inner column-side surface 431 of the leg portion 43 has a shape that fits to the shape of the external wall of the inner column 51. For example, the leg portion 43 has two circular depressions 45 on a surface on an opposite side from a surface that faces the inner column 51.

In addition, as illustrated in FIG. 10, the inner column bracket 4 includes a notch portion 46, a depression 48, and a through-hole 47. The notch portion 46 is a notch formed on a surface that faces the inner column 51 in a front side-end portion of the inner column bracket 4. For example, the depression 48 is a hollow having a shape of a substantially rectangular parallelepiped formed in a bottom portion of the notch portion 46. The through-hole 47 is provided in a bottom portion of the depression 48, and penetrates through the arm portion 41 in a radial direction of the inner column 51. A damper 9 is provided in the notch portion 46, the depression 48, and the through-hole 47.

As illustrated in FIG. 11, the inner column bracket 4 is connected to the first telescopic friction plates 21 disposed on the both sides of the outer column 54. The inner column bracket 4 is supported by the first telescopic friction plates 21 since the insertion portions 42 are inserted into the holes provided in the first telescopic friction plates 21. In addition, the first telescopic friction plates 21 disposed on the both sides of the outer column 54 face each other with the arm portion 41 of the inner column bracket 4 interposed therebetween. Further, the inner column bracket 4 is connected to the inner column 51 through the leg portion 43.

To detachably connect the inner column bracket 4 to the inner column 51, first holes 51h are formed in the inner column 51 and second holes 43h are formed in bottom faces of the depressions 45 of the leg portion 43, as illustrated in FIG. 10. The first holes 51h communicate with the second holes 43h. For example, in the present embodiment, two first holes 51h and two second holes 43h are provided, and all inner circumferences thereof are the same. Since shear pins 8 are inserted into positions across the first holes 51h and the second holes 43h, the inner column bracket 4 and the inner column 51 are detachably connected to each other. In addition, the first holes 51h and the second holes 43h are disposed at positions, distances of which from the respective first telescopic friction plates 21 disposed on the both sides of the outer column 54 are equal to one another.

Further, the inner column bracket 4 is disposed such that at least a portion of the inner column bracket 4 fits in the first slit 541 of the outer column 54. Specifically, the portion fits in the first slit 541 such that the leg portion 43 of the inner column bracket 4 faces an internal wall of the first slit 541.

The inner column bracket 4 is attached to the inner column 51, and may slide in a state in which the inner column bracket 4 faces the internal wall of the first slit 541 when a telescopic adjustment is performed. The inner column bracket 4 regulates an adjustment range of a telescopic position by coming into contact with a first internal end portion wall 541e corresponding to an internal wall of a front side-end portion of the first slit 541 when the telescopic position is adjusted. In addition, as illustrated in FIG. 9, a distance from the stopper 7 to a front side-end portion of the second slit 542 is longer than a distance from the inner column bracket 4 to the first internal end portion wall 541e. Accordingly, after the inner column bracket 4 is detached from the inner column 51, an amount at which the inner column 51 moves to the front (stroke amount) is ensured to be greater than or equal to a predetermined amount. Therefore, in the present embodiment, a front-side boundary of the telescopic position is regulated by the inner column bracket 4 and the first internal end portion wall 541e, and a rear-side boundary of the telescopic position is regulated by the stopper 7 and the second internal end portion wall 542e.

Figure 13:
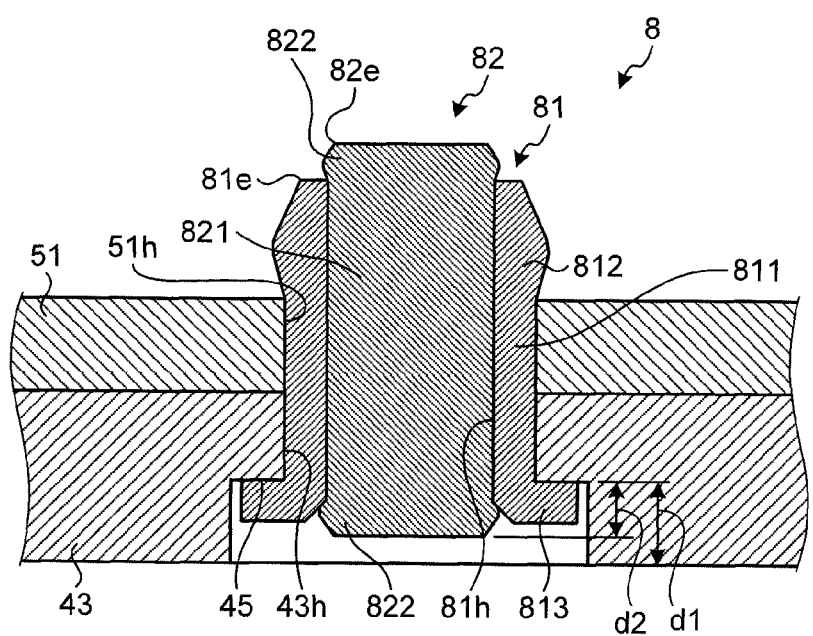
FIG. 13 is an enlarged view of a portion around a shear pin of FIG. 10.
Figure 14:
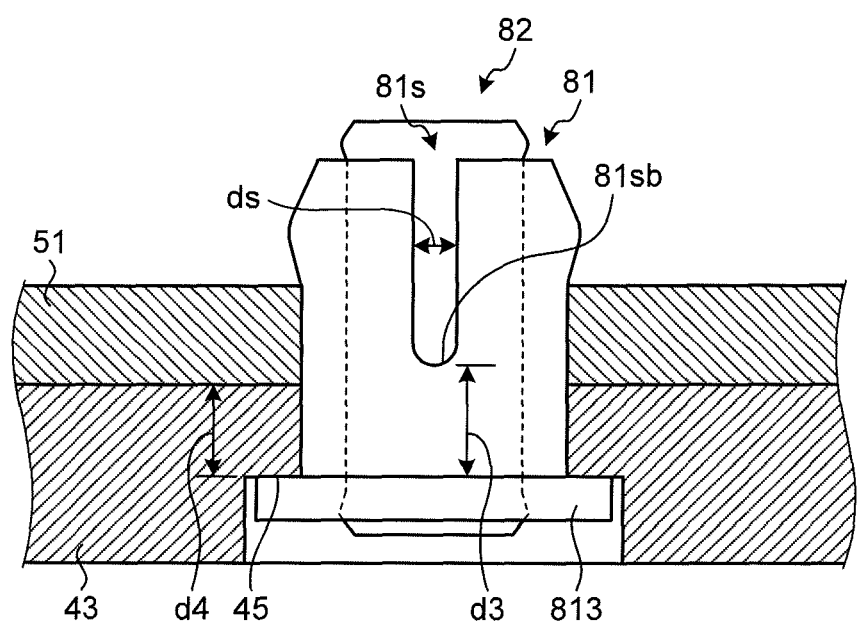
FIG. 14 is a diagram illustrating only the shear pin of FIG. 13 as a side view.

FIG. 13 is an enlarged view of a portion around a shear pin of FIG. 10. FIG. 14 is a diagram illustrating only the shear pin of FIG. 13 as a side view. In the present embodiment, the shear pin 8 includes an outer pin 81 and an inner pin 82. For example, the outer pin 81 and the inner pin 82 are formed using a resin such as polyacetal.

As illustrated in FIG. 13, the outer pin 81 is a cylindrical member that penetrates the first hole 51h and the second hole 43h. For example, the outer pin 81 includes a main body portion 811, a locking portion 812, a flange portion 813, and a guide hole 81h. The main body portion 811 has a cylindrical shape, and penetrates through the first hole 51h and the second hole 43h. The locking portion 812 is provided at one end of the main body portion 811, and is positioned inside the inner column 51. The locking portion 812 has a cylindrical shape, and has an outer circumference which is greater than an inner circumference of the first hole 51h and an inner circumference of the second hole 43h. Accordingly, the locking portion 812 comes into contact with an internal wall of the inner column 51, and thus the outer pin 81 is less likely to fall out of the first hole 51h and the second hole 43h. The flange portion 813 is provided at the other end of the main body portion 811, and is positioned outside the second hole 43h in the radial direction of the inner column 51. For example, the flange portion 813 has a disc shape, and has an outer circumference which is greater than the inner circumference of the first hole 51h and the inner circumference of the second hole 43h. Accordingly, the flange portion 813 comes into contact with a bottom surface of the depression 45, and thus the outer pin 81 is less likely to fall out of the first hole 51h and the second hole 43h. The guide hole 81h is a through-hole that penetrates from the flange portion 813 up to the locking portion 812.

In the present embodiment, the outer pin 81 is inserted into the first hole 51h and the second hole 43h by press-fitting. When the outer pin 81 is inserted into the first hole 51h and the second hole 43h, the first hole 51h and the second hole 43h are positioned. For example, the locking portion 812 is inserted into the first hole 51h and the second hole 43h from a side of the second hole 43h. The locking portion 812 is formed such that an outer circumference in an end portion 81e on an opposite side from the main body portion 811 is smaller than the inner circumference of the first hole 51*h* and the inner circumference of the second hole 43*h*. Accordingly, the locking portion 812 is easily inserted into the second hole 43*h*.

The outer pin 81 may be inserted into the first hole 51*h* and the second hole 43*h* from a side of the first hole 51*h*. In addition, the outer pin 81 may be press-fitted after providing a rib and the like on an external wall of the main body portion 811.

As illustrated in FIG. 14, the outer pin 81 includes one notch 81*s* which is provided from the locking portion 812 toward the flange portion 813. When the locking portion 812 is inserted into the second hole 43*h*, the outer circumference of the locking portion 812 decreases as a width ds of the notch 81*s* in a circumferential direction of the outer pin 81 decreases. Accordingly, the locking portion 812 easily passes through the first hole 51*h* and the second hole 43*h*. In description below, the width ds of the notch 81*s* in the circumferential direction of the outer pin 81 is simply described as the width ds of the notch 81*s*.

The outer pin 81 may include a plurality of notches 81*s*. When the plurality of notches 81*s* is included, the plurality of notches 81*s* is preferably disposed at equal intervals in the circumferential direction of the outer pin 81.

Before the outer pin 81 penetrates through the first hole 51*h* and the second hole 43*h*, an outer circumference of the main body portion 811 is greater than the inner circumference of the first hole 51*h* and the inner circumference of the second hole 43*h*. Further, in a state in which the outer pin 81 penetrates through the first hole 51*h* and the second hole 43*h*, the outer circumference of the main body portion 811 becomes equal to the inner circumference of the first hole 51*h* and the inner circumference of the second hole 43*h* when the main body portion 811 is elastically deformed. Accordingly, the main body portion 811 presses an internal wall of the first hole 51*h* and an internal wall of the second hole 43*h*. For this reason, a gap between the main body portion 811 and the internal wall of the first hole 51*h* and a gap between the main body portion 811 and the internal wall of the second hole 43*h* are is less likely to be generated. Accordingly, a wobble of the outer pin 81 is suppressed.

The inner pin 82 is a member inserted into the guide hole 81*h* of the outer pin 81. For example, the inner pin 82 includes a body portion 821 and a large-diameter portion 822. The body portion 821 has a cylindrical shape and penetrates through the guide hole 81*h*. The large-diameter portion 822 is provided at both ends of the body portion 821, and is positioned outside the guide hole 81*h*. The large-diameter portion 822 has an outer circumference which is greater than an inner circumference of the guide hole 81*h*. Accordingly, the large-diameter portion 822 comes into contact with edges of both ends of the guide hole 81*h*, and thus the inner pin 82 is less likely to fall out of the outer pin 81.

The guide hole 81*h* may include a stepped portion formed by enlarging the inner circumference in an end portion. In this case, the large-diameter portion 822 comes into contact with an edge of the stepped portion, and thus the inner pin 82 is less likely to protrude from the end portion of the guide hole 81*h*.

In the present embodiment, the inner pin 82 is inserted into the guide hole 81*h* by press-fitting. For example, the large-diameter portion 822 is inserted into the guide hole 81*h* from a side of the flange portion 813. The large-diameter portion 822 is formed such that an outer circumference in an end portion 82*e* on an opposite side from the body portion 821 is smaller than an inner circumference of the outer pin 81. Accordingly, the large-diameter portion 822 is easily inserted into the guide hole 81*h*. In addition, the inner pin 82 includes the same large-diameter portions 822 at both ends, and thus the inner pin 82 may be inserted into the guide hole 81*h* from any one of the ends. Accordingly, the shear pin 8 may be easily assembled.

Before the inner pin 82 is inserted into the guide hole 81*h*, an outer circumference of the body portion 821 may be larger than the inner circumference of the guide hole 81*h*. In addition, in a state in which the body portion 821 penetrates through the guide hole 81*h*, the outer circumference of the body portion 821 becomes equal to the inner circumference of the guide hole 81*h* since the body portion 821 is elastically deformed. Accordingly, the body portion 821 presses an internal wall of the guide hole 81*h* outward in a radial direction. For this reason, a gap between the body portion 821 and the internal wall of the guide hole 81*h* is less likely to be generated. Accordingly, a wobble of the inner pin 82 is suppressed.

As the body portion 821 presses the internal wall of the guide hole 81*h* outward in the radial direction, a force for enlarging the width ds of the notch 81*s* is applied to the outer pin 81. Accordingly, frictional forces generated between the outer pin 81 and the internal wall of the first hole 51*h* and between the outer pin 81 and the internal wall of the second hole 43*h* increase. Further, the width ds of the notch 81*s* in the locking portion 812 increases, and thus, the outer circumference of the locking portion 812 increases. For this reason, the shear pin 8, in which the outer pin 81 and the inner pin 82 are integrated with each other, is fixed to a position across the first hole 51*h* and the second hole 43*h*, and connects the inner column 51 and the inner column bracket 4 to each other.

The steering device 100 is assembled by inserting the inner pin 82 after positioning the first hole 51*h* and the second hole 43*h* by the outer pin 81, and thus may be easily assembled.

In addition, by using the shear pin 8 in the first hole 51*h* and the second hole 43*h*, the steering device 100 according to the present embodiment is unnecessary to use a device for filling a resin member and a member for receiving the resin member, as compared to a case in which the first hole 51*h* and the second hole 43*h* are filled with the resin member. For this reason, the steering device 100 according to the present embodiment can be easily assembled.

As illustrated in FIG. 13, a depth d1 of the depression 45 is preferably greater than or equal to a length d2 of a portion that protrudes from the second hole 43*h* of the shear pin 8. Accordingly, the shear pin 8 does not protrude from a surface of the inner column bracket 4. For this reason, a possibility of damaging the shear pin 8 by an external force is reduced.

When an excessive load is applied to the steering wheel 14, the load is transmitted to the inner column 51 through the input shaft 151, and moves the inner column 51 to the front. On the other hand, the inner column bracket 4 supported by the first telescopic friction plates 21 does not move. For this reason, a shear force is applied to the shear pin 8. Thus, when the load exceeds an allowed shear force of the shear pin 8, the shear pin 8 is cut. When the shear pin 8 is cut, connection between the inner column 51 and the inner column bracket 4 is released. When the connection between the inner column 51 and the inner column bracket 4 is released, the inner column 51 is supported in an axial direction by a frictional force generated between the inner column 51 and the outer column 54. Therefore, when the operator collides with the steering wheel 14 and the excessive load is applied, a force for moving the inner column 51 is reduced immediately after the excessive load is applied, thereby absorbing impact.

In addition, even when the shear pin 8 is cut, the outer column 54 is continuously supported by the outer column bracket 52 which is fixed to the vehicle body-side member 13. Further, the inner column 51 is continuously supported by the outer column 54. For this reason, even when the shear pin 8 is cut, the steering column 5 does not fall.

Figure 15:
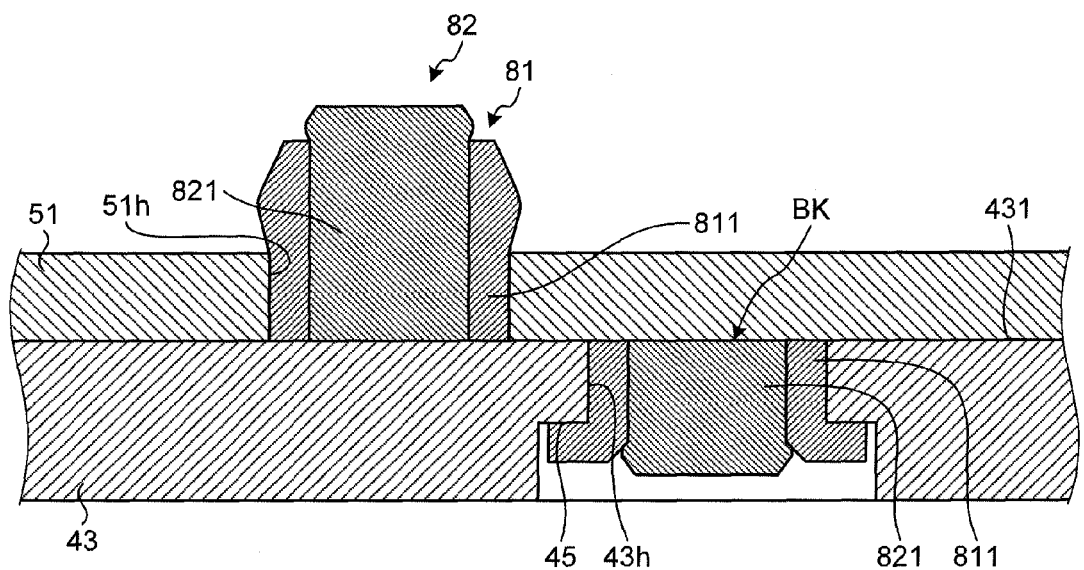
FIG. 15 is a diagram for description of a state of the shear pin after the shear pin is cut.

FIG. 15 is a diagram for description of a state of the shear pin after the shear pin is cut. As illustrated in FIG. 15, the shear pin 8 is cut at a section BK. The section BK is generated in the portion across the first hole 51h and the second hole 43h in the shear pin 8. In a cross-section illustrated in FIG. 15, the section BK is located on an extended line of the external wall of the inner column 51, that is, on an extended line of the inner column-side surface 431 of the leg portion 43. The outer pin 81 is cut at the main body portion 811, and the inner pin 82 is cut at the body portion 821. For this reason, the allowed shear force of the shear pin 8 depends on a cross-sectional area of the main body portion 811 and a cross-sectional area of the body portion 821 in the section BK.

As illustrated in FIG. 14, a distance d3 from the flange portion 813 to a distal end 81sb of the notch 81s is preferably greater than a distance d4 from the flange portion 813 to the external wall of the inner column 51. Accordingly, the notch 81s is not included in the section BK when the shear pin 8 is cut. For this reason, a defective portion corresponding to the notch 81s is excluded from a cross section of the main body portion 811 in the section BK, and thus a variation of the allowed shear force of the shear pin 8 is suppressed.

In addition, after the shear pin 8 is cut, the inner column 51 preferably moves straight in the axial direction since a possibility that movement of the inner column 51 is hindered or a possibility that the frictional force generated between the inner column 51 and the outer column 54 will become greater than a predetermined value increases when a direction in which the inner column 51 moves forms an angle with an axial direction of the outer column 54.

In the present embodiment, as illustrated in FIG. 11, the inner column bracket 4 is joined to the first telescopic friction plates 21 disposed on the both sides of the outer column 54. Accordingly, when a load is applied to the inner column bracket 4 in an axial direction, the inner column bracket 4 receives a clamping force from the both sides of the outer column 54. For this reason, an attitude of the inner column bracket 4 is stable when the shear pin 8 is cut. Therefore, an attitude formed when the inner column 51 starts to move is easily maintained in a straight direction with respect to the axial direction. Accordingly, the inner column 51 easily moves straight in the axial direction.

In addition, as illustrated in FIG. 10 and FIG. 11, the two first holes 51h and the two second holes 43h are provided at different positions in the axial direction. For this reason, two shear pins 8 are disposed at different positions in the axial direction. When one first hole 51h and one second hole 43h are provided, that is, when one shear pin 8 is disposed, the inner column bracket 4 may rotate about the shear pin 8. On the other hand, in the present embodiment, rotation of the inner column bracket 4 is suppressed by disposing the two shear pins 8 at the different positions in the axial direction. For this reason, the attitude of the inner column bracket 4 is more stable when the shear pins 8 are cut.

Further, the first holes 51h and the second holes 43h are disposed at positions, distances of which from the first telescopic friction plates 21, facing each other at both sides with the inner column bracket 4 interposed therebetween, are equal to each other. Accordingly, when a load is applied to the inner column bracket 4 in the axial direction, the inner column bracket 4 more evenly receives the clamping force from the both sides of the outer column 54. Thus, the attitude of the inner column bracket 4 is stable when the shear pins 8 are cut. Therefore, the attitude formed when the inner column 51 starts to move is more easily maintained in the straight direction with respect to the axial direction. Accordingly, the inner column 51 more easily moves straight in the axial direction.

In addition, even when the inner column bracket 4 cannot evenly receive the clamping force from the both sides of the outer column 54, the inner column 51 is guided in the longitudinal direction of the second slit 542, that is, the axial direction since the stopper 7 is fit to the second slit 542. For this reason, the attitude of the inner column bracket 4 is stable when the shear pins 8 are cut.

The allowed shear force of the shear pin 8 may be adjusted by changing the numbers of the first holes 51h and the second holes 43h, cross-sectional areas of the first holes 51h and the second holes 43h, and a material of the shear pin 8. For example, each of the numbers of the first holes 51h and the second holes 43h may be one or may be three or more. In addition, for example, the shear pin 8 may be formed using metal that contains nonferrous metal, rubber, or the like.

The shear pin 8 is not necessarily include the outer pin 81 and the inner pin 82 described above. For example, the shear pin 8 may be formed when resin or the like, which fills the positions across the first holes 51h and the second holes 43h, hardens.

Figure 16:
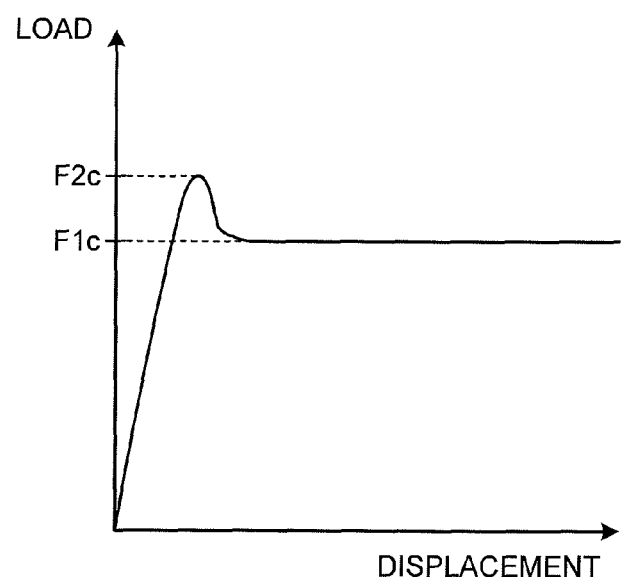
FIG. 16 is a graph illustrating a relation between a displacement of a steering column and a load necessary to move the steering column with regard to a comparative example.
Figure 17:
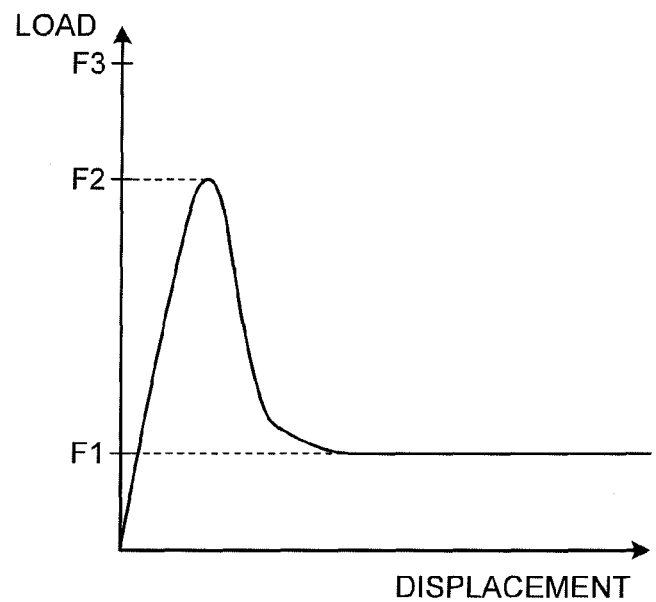
FIG. 17 is a diagram illustrating a relation between a displacement of a steering column and a load necessary to move the steering column with regard to the present embodiment.

FIG. 16 is a graph illustrating a relation between a displacement of the steering column and a load necessary to move the steering column with regard to a comparative example. FIG. 17 is a diagram illustrating a relation between a displacement of the steering column and a load necessary to move the steering column with regard to the present embodiment. Referring to FIG. 16 and FIG. 17, a horizontal axis indicates a forward displacement of the steering column, and a vertical axis indicates a load necessary to move the steering column forward.

The comparative example is an example of a case in which an outer column is attached to a vehicle body through a capsule as in the technology described in Prior Art 1. In the comparative example, the outer column is disposed on the rear side relative to an inner column. In addition, when an excessive load is applied to the outer column, a rod is in contact with an end portion of a telescopic adjustment hole integrally provided with the outer column, and the load is delivered to the capsule through a bracket. A force $F2c$ illustrated in FIG. 16 indicates an allowed shear force of the capsule.

In the comparative example, the outer column is supported in an axial direction by a frictional force generated between the outer column and the inner column by tightening of the bracket. A force $F1c$ illustrated in FIG. 16 indicates the frictional force that supports the outer column. The force $F1c$ is smaller than the force $F2c$. The force $F1c$ needs to be maintained at a predetermined value or more to prevent the outer column from moving due to a load applied in normal use.

In the comparative example, when a load greater than or equal to the force $F2c$ is applied to the outer column, the capsule is cut, and the outer column is separated from the vehicle body. Thereafter, the outer column moves in the axial direction while absorbing impact by the frictional force between the outer column and the inner column. However, as described in the foregoing, since the force F1c is maintained at the predetermined value or more, there is difficulty in more easily protecting the operator from a secondary collision by smoothening movement of the outer column.

On the other hand, in the present embodiment, the inner column 51 is supported in the axial direction by a first frictional force generated between the inner column 51 and the outer column 54 by tightening of the outer column bracket 52, and a second frictional force generated between the first telescopic friction plates 21 and members that is in contact with the first telescopic friction plates 21 (the outer column bracket 52, the second telescopic friction plate 22, and the outer column 54). Referring to FIG. 17, a force F1 indicates the first frictional force, and a force F3 indicates the sum of the first frictional force and the second frictional force. In addition, a force F2 illustrated in FIG. 17 indicates the allowed shear force of the shear pin 8. The force F2 is smaller than the force F3 and larger than the force F1.

In the present embodiment, when a load greater than or equal to the force F2 is applied to the inner column 51, the shear pin 8 is cut, and the inner column 51 is separated from the inner column bracket 4. Accordingly, connection between the inner column 51 and the first telescopic friction plates 21 is released, and thus the above-described second frictional force is not applied to the inner column 51. For this reason, after the shear pin 8 is cut, the inner column 51 moves in the axial direction while absorbing impact by the above-described first frictional force. When the first frictional force is set to be small, the steering device 100 according to the present embodiment may more easily protect the operator from a secondary collision by smoothening movement of the inner column 51.

In the present embodiment, even when the first frictional force is set to be small, the second frictional force may complement a force corresponding to a reduced first frictional force in a force for supporting the inner column 51 in the axial direction. For this reason, the steering device 100 according to the present embodiment may suppress movement of the inner column 51 due to a load applied in normal use, and more easily protect the operator from the secondary collision by adjusting a set value of the first frictional force and a set value of the second frictional force.

Incidentally, in normal use, when the inner column bracket 4 comes into contact with the first internal end portion wall 541e at the time of performing a telescopic adjustment after operating the operating lever 53, a shear force is applied to the shear pin 8. For this reason, when an excessive force is applied to the inner column 51 at the time of the telescopic adjustment, there is a possibility that the shear pin 8 will be cut by the telescopic adjustment. Therefore, the steering device 100 according to the present embodiment includes the damper 9. As illustrated in FIG. 10, for example, the damper 9 is attached to the front side-end portion of the inner column bracket 4. More specifically, the damper 9 is fixed to the inner column bracket 4 by penetrating through the through-hole 47 of the inner column bracket 4.

Figure 18:
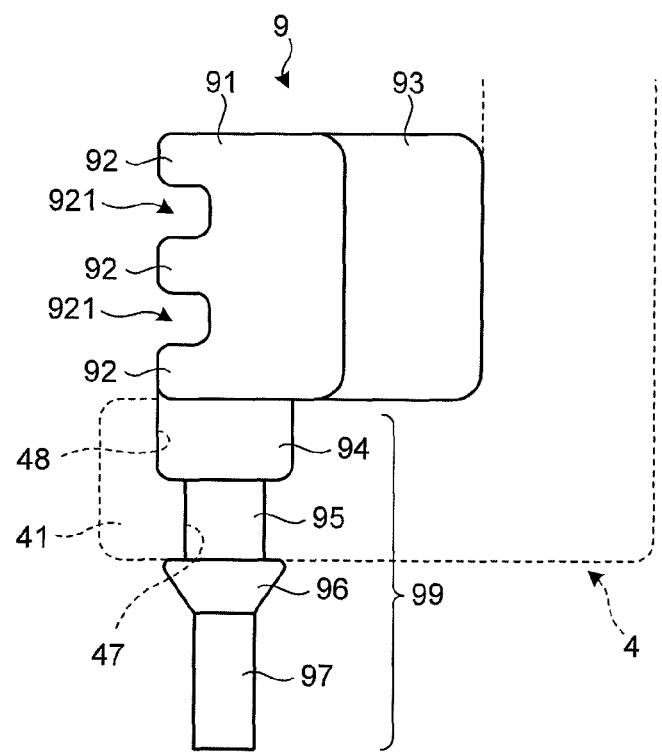
FIG. 18 is a side view of a damper according to the present embodiment.
Figure 19:
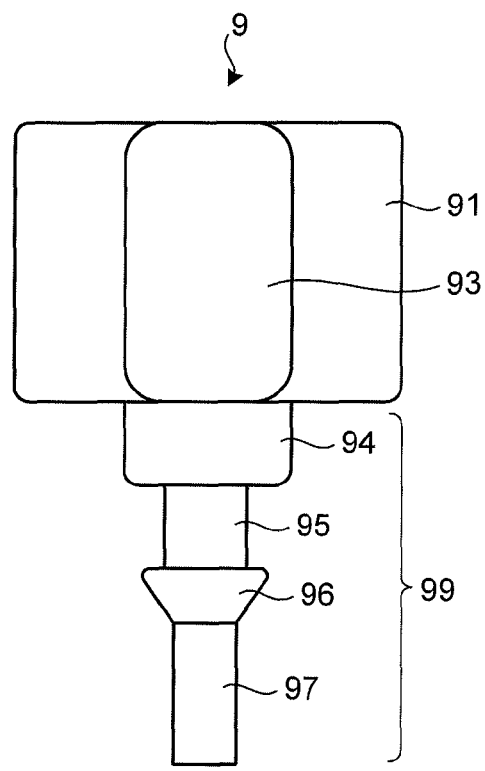
FIG. 19 is a rear view of the damper according to the present embodiment.
Figure 20:
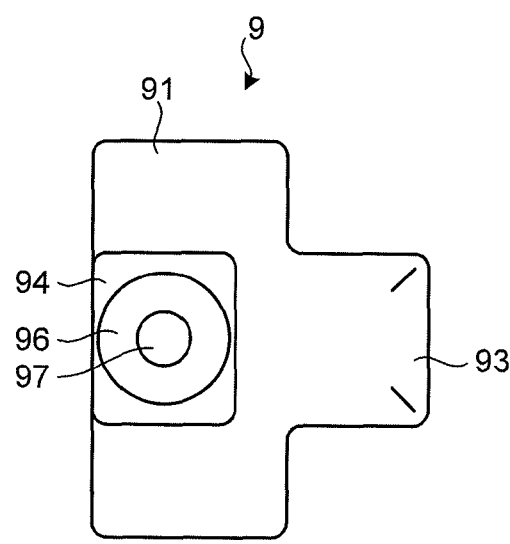
FIG. 20 is a bottom view of the damper according to the present embodiment.
Figure 21:
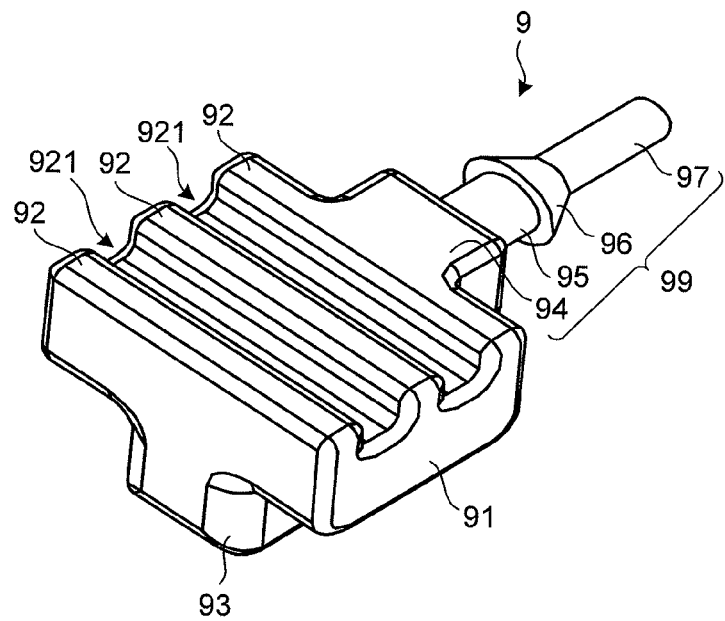
FIG. 21 is a perspective view of the damper according to the present embodiment when viewed from a front side.
Figure 22:
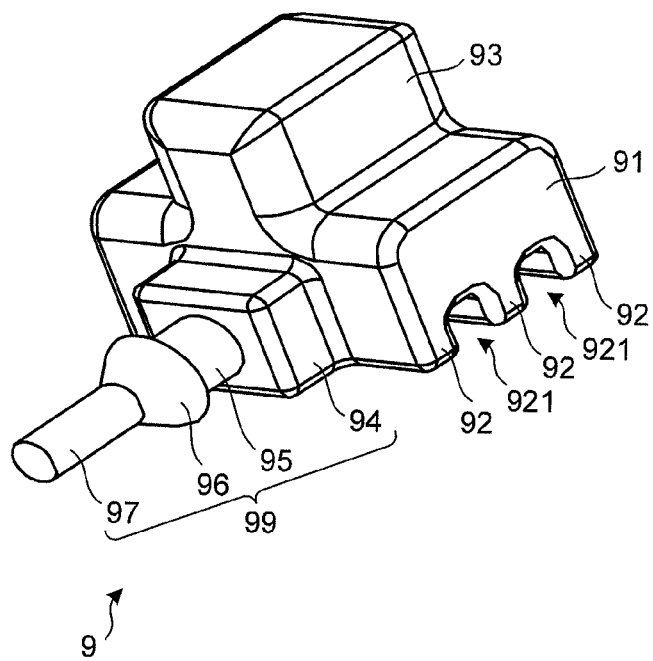
FIG. 22 is a perspective view of the damper according to the present embodiment when viewed from a rear side.

FIG. 18 is a side view of the damper according to the present embodiment. FIG. 19 is a rear view of the damper according to the present embodiment. FIG. 20 is a bottom view of the damper according to the present embodiment. FIG. 21 is a perspective view of the damper according to the present embodiment when viewed from a front side. FIG. 22 is a perspective view of the damper according to the present embodiment when viewed from a rear side. In FIG. 18, a portion indicated by a broken line is the inner column bracket 4. As illustrated in FIG. 18 to FIG. 22, for example, the damper 9 is formed of synthetic rubber, and includes a base portion 91, a front protrusion 92, a rear protrusion 93, and a locking portion 99.

For example, the base portion 91 has a shape of a substantially rectangular parallelepiped, and faces the first internal end portion wall 541e. The front protrusion 92 protrudes forward from the base portion 91. For example, the front protrusion 92 has a shape of a substantially rectangular parallelepiped, a longitudinal direction of which corresponds to a transverse direction of the first slit 541. For example, three front protrusions 92 are formed at a front side of the base portion 91, and the three front protrusions 92 are parallel to one another. A depression 921 is formed between front protrusions 92. The rear protrusion 93 protrudes backward from the base portion 91 and, for example, has a shape of a substantially rectangular parallelepiped.

Incidentally, two front protrusions 92 may be provided, or four or more front protrusions 92 may be provided. In addition, the front protrusion 92 may not have the shape of the rectangular parallelepiped. For example, the front protrusion 92 may have a substantially cylindrical shape, a substantially conical shape, a substantially hemisphere shape, or the like.

The locking portion 99 includes a downward protrusion 94, a penetration portion 95, a positioning portion 96, and a guide portion 97. The downward protrusion 94 protrudes downward from the base portion 91. For example, the downward protrusion 94 has a shape of a substantially rectangular parallelepiped. The downward protrusion 94 fits in the depression 48 of the inner column bracket 4. The penetration portion 95 protrudes downward from a portion of a bottom of the downward protrusion 94 and, for example, has a cylindrical shape. The penetration portion 95 penetrates through the through-hole 47 of the inner column bracket 4. An outer circumference of the penetration portion 95 is substantially equal to an inner circumference of the through-hole 47. The positioning portion 96 protrudes downward from a lower end portion of the penetration portion 95 and, for example, has a substantially conical shape, an outer circumference of which decreases downward from a side of the penetration portion 95. An upper end portion, that is, a maximum outer circumference portion of the positioning portion 96 comes into contact with a surface of the arm portion 41 of the inner column bracket 4. An outer circumference in the upper end portion (maximum outer circumference portion) of the positioning portion 96 is larger than the inner circumference of the through-hole 47. In addition, an outer circumference in a lower end portion (minimum outer circumference portion) of the positioning portion 96 is smaller than the inner circumference of the through-hole 47. The guide portion 97 protrudes downward from the lower end portion of the positioning portion 96 and, for example, has a cylindrical shape. An outer circumference of the guide portion 97 is smaller than the inner circumference of the through-hole 47.

When the damper 9 is attached to the inner column bracket 4, the locking portion 99 is inserted into the through-hole 47 from a side of the depression 48. Since the outer circumference of the guide portion 97 is smaller than the inner circumference of the through-hole 47, the guide portion 97 may easily enter the through-hole 47. Thereafter, for example, after the positioning portion 96 comes into contact with an edge of the through-hole 47, a pressure is applied to the locking portion 99, and the positioning portion 96 is pushed into the through-hole 47. That is, the positioning portion 96 is press-fitted into the through-hole 47. In a state in which the guide portion 97 is inserted into the through-hole 47 in advance, the positioning portion 96 passes through the through-hole 47 while being pushed into the through-hole 47 and being elastically deformed. After passing through the through-hole 47, the positioning portion 96 restores a shape and comes into contact with the surface of the arm portion 41 such that the damper 9 is less likely to fall out upward.

When the locking portion 99 is pushed into the through-hole 47, there is a possibility that the locking portion 99 will fall over. However, in the present embodiment, even when the locking portion 99 falls over, the guide portion 97 is in contact with an internal wall of the through-hole 47. Accordingly, an angle at which the locking portion 99 falls over is regulated at a predetermined angle or less. Accordingly, an attitude of the locking portion 99 is easily stabilized when the locking portion 99 is pushed into the through-hole 47. For this reason, the damper 9 is easily attached to the inner column bracket 4.

In addition, when a load is applied to the base portion 91 at the time of a telescopic adjustment, there is a possibility that the locking portion 99 will be cut at a boundary between the locking portion 99 and the base portion 91 due to a shear force generated between the locking portion 99 and the base portion 91. However, in the present embodiment, the locking portion 99 includes the downward protrusion 94, a cross-sectional area of which is larger than that of the penetration portion 95, and thus the locking portion 99 is less likely to be cut at the boundary between the locking portion 99 and the base portion 91. For this reason, the damper 9 is less likely to be damaged.

A shape of the damper 9 is not limited to the above-described shapes. For example, the front protrusion 92 may be disposed at a position of the rear protrusion 93, and the rear protrusion 93 may be disposed at a position of the front protrusion 92. In addition, the damper 9 may include a cavity therein.

Figure 23:
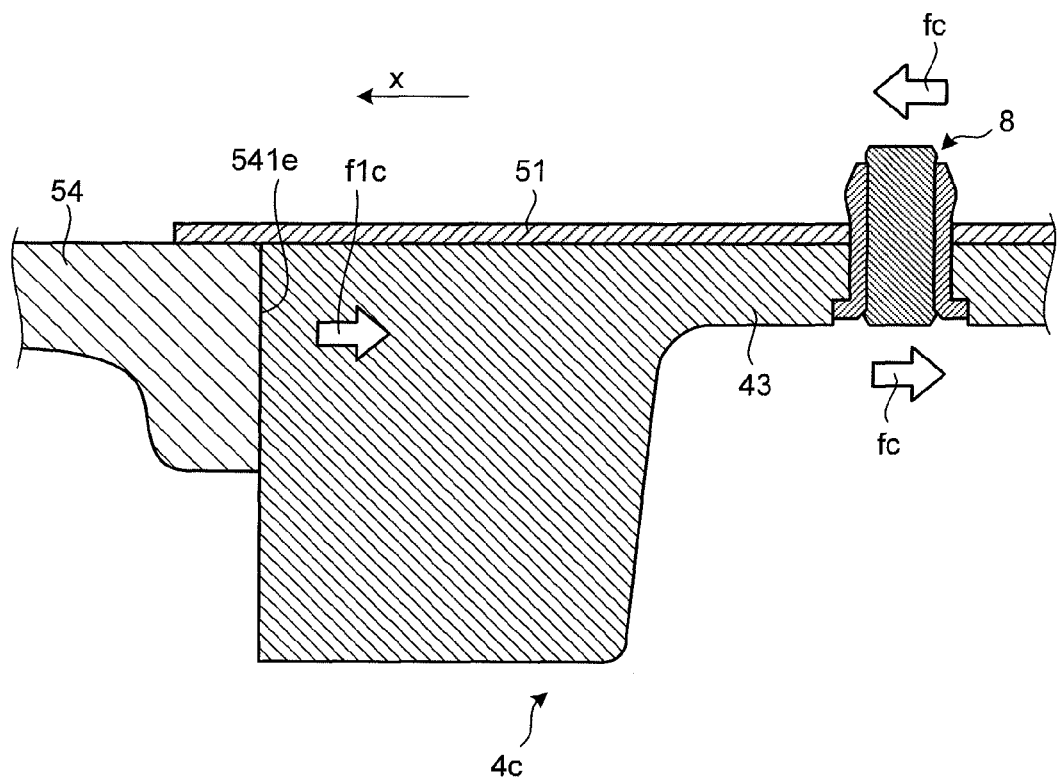
FIG. 23 is a diagram illustrating a state in which an inner column bracket is in contact with a first internal end portion wall with regard to a comparative example.
Figure 24:
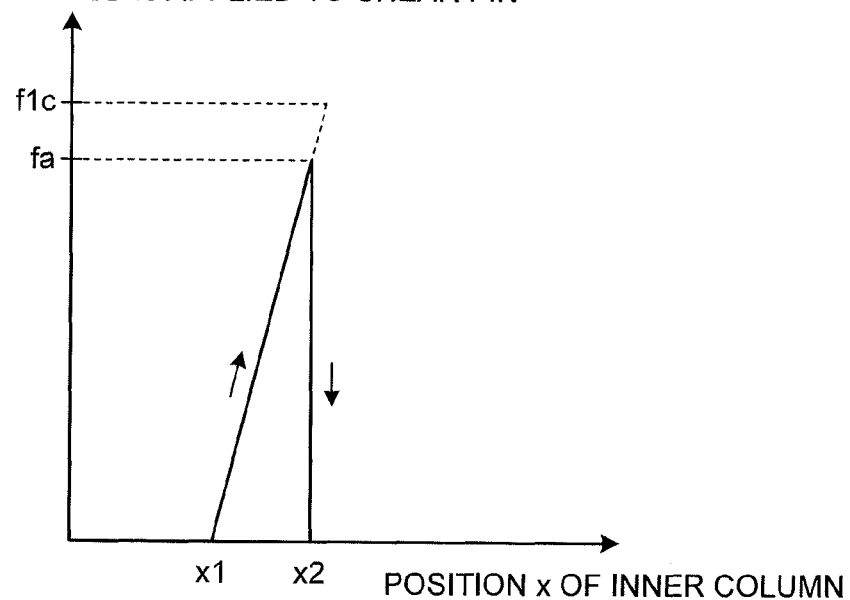
FIG. 24 is a graph illustrating a relation between a position of an inner column and a shear force applied to a shear pin with regard to the comparative example.

FIG. 23 is a diagram illustrating a state in which an inner column bracket is in contact with a first internal end portion wall with regard to a comparative example. FIG. 24 is a graph illustrating a relation between a position of an inner column and a shear force applied to a shear pin with regard to the comparative example. A inner column bracket 4c according to the comparative example is different from the inner column bracket of the present embodiment in that the damper 9 is not included. Referring to FIG. 23 and FIG. 24, a position in an axial direction of the inner column 51 is indicated by x, and a value of x increases as the position of the inner column 51 moves forward. Referring to FIG. 24, a value of x obtained when a front side-end portion of the inner column bracket 4c comes into contact with a first internal end portion wall 541e is indicated by x1.

In the comparative example, when a telescopic position becomes a forefront (x=x1) at the time of performing the telescopic adjustment after operating an operating lever 53, the front side-end portion of the inner column bracket 4c comes into contact with the first internal end portion wall 541e. When a force f1c is applied to the inner column 51 in a state in which the inner column bracket 4c comes into contact with the first internal end portion wall 541e, the force f1c is applied to the inner column bracket 4c as a reaction force from the first internal end portion wall 541e. The inner column bracket 4c is made of metal, and thus an elastic deformation amount thereof is significantly small. Therefore, a force having a magnitude substantially equivalent to that of the force f1c is applied to the shear pin 8 as a shear force fc. For this reason, as illustrated in FIG. 24, when the force f1c is larger than an allowed shear force fa of the shear pin 8, the shear force fc applied to the shear pin 8 is highly likely to be larger than the allowed shear force fa of the shear pin 8. Accordingly, in the comparative example, when the inner column bracket 4c collides with the first internal end portion wall 541e at a larger force than the allowed shear force fa of the shear pin 8 at the time of performing the telescopic adjustment, the shear pin 8 is cut at a point in time that is x=x2 in FIG. 24. When the shear pin 8 is cut at the point in time that is x=x2, the shear force fc applied to the shear pin 8 becomes 0, as illustrated in FIG. 24.

Figure 25:
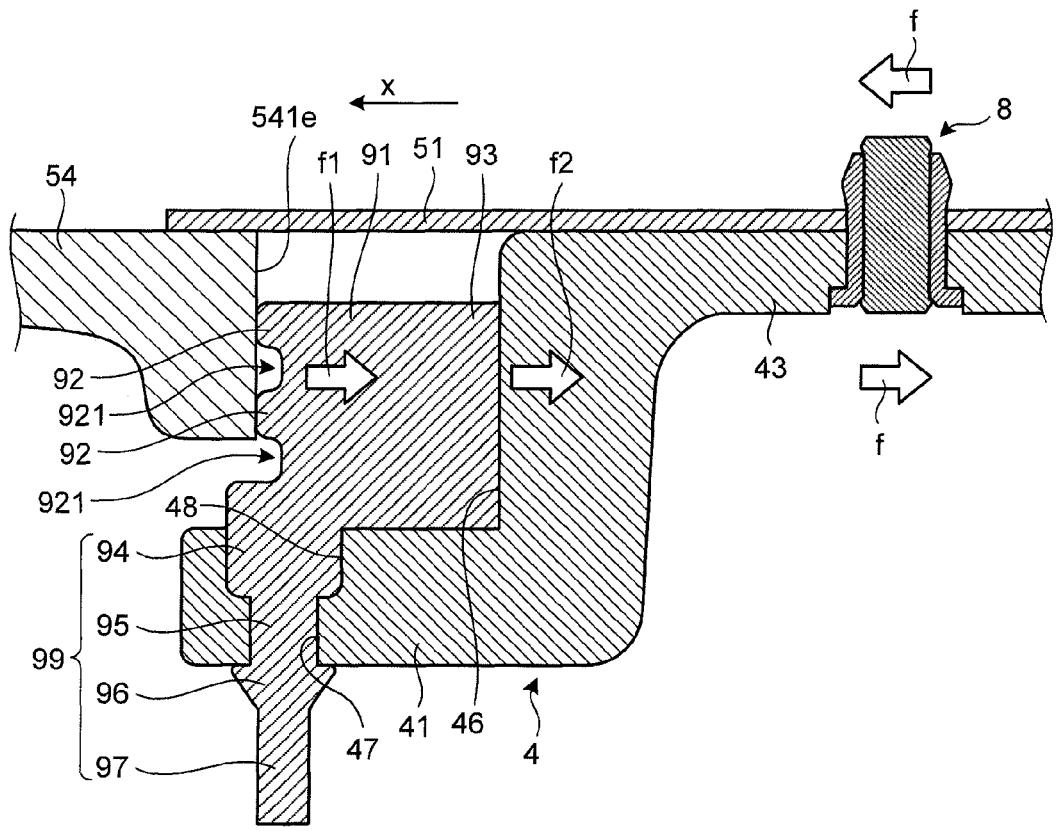
FIG. 25 is a diagram illustrating a state in which an inner column bracket is in contact with a first internal end portion wall with regard to the present embodiment.
Figure 26:
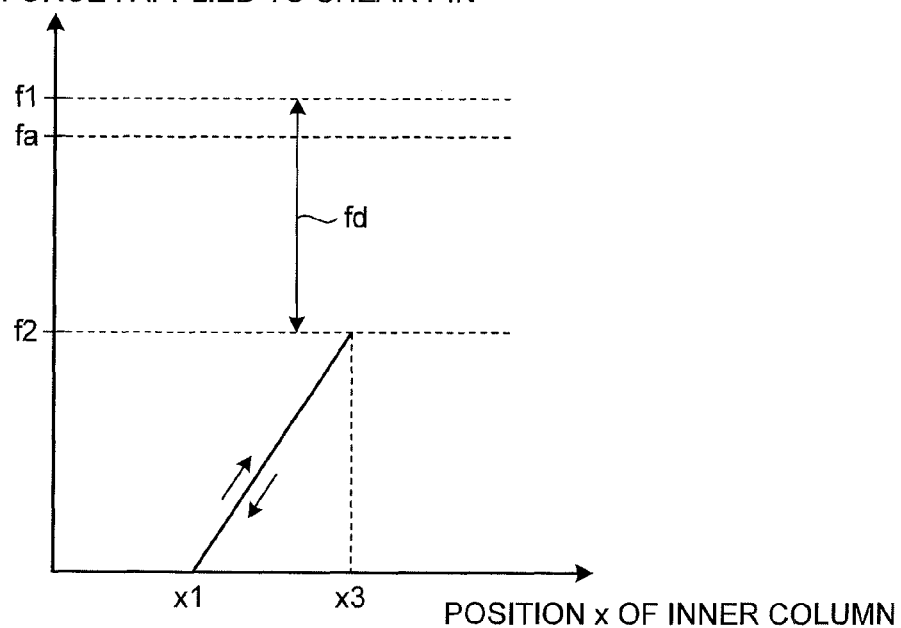
FIG. 26 is a graph illustrating a relation between a position of the inner column and a shear force applied to the shear pin with regard to the present embodiment.

FIG. 25 is a diagram illustrating a state in which the inner column bracket is in contact with the first internal end portion wall with regard to the present embodiment. FIG. 26 is a graph illustrating a relation between a position of the inner column and a shear force applied to the shear pin with regard to the present embodiment. Referring to FIG. 25 and FIG. 26, a position in the axial direction of the inner column 51 is indicated by x, and a value of x increases as the position of the inner column 51 moves forward. Referring to FIG. 26, a value of x obtained when the damper 9 comes into contact with the first internal end portion wall 541e is indicated by x1.

Contrary to the above-described comparative example, in the present embodiment, when a telescopic position becomes a forefront (x=x1) at the time of performing a telescopic adjustment after operating the operating lever 53, the damper 9 comes into contact with the first internal end portion wall 541e. More specifically, the front protrusion 92 of the damper 9 comes into contact with the first internal end portion wall 541e. Accordingly, first, the front protrusion 92 is elastically deformed. Since the depression 921 is formed between the front protrusions 92, the front protrusion 92 is easily and elastically deformed and absorbs a certain impact. In addition, a force is transmitted from the front protrusion 92 to the base portion 91 and the rear protrusion 93, and the base portion 91 and the rear protrusion 93 are elastically deformed. When spring constants of the front protrusion 92, the base portion 91, and the rear protrusion 93 are set to k92, k91, and k93, respectively, and a spring constant of a combination of the front protrusion 92, the base portion 91, and the rear protrusion 93 is set to K, K is defined by Equation (1) below. The damper 9 according to the present embodiment becomes an elastic body having a predetermined spring constant K, that is, a predetermined impact absorbing capability when k92, k91, and k93 are appropriately adjusted.

$$1/K=(1/k92)+(1/k91)=(1/k93) \qquad (1)$$

When a force f1 is applied to the inner column 51 in a state in which the damper 9 comes into contact with the first internal end portion wall 541e, the force f1 is applied to the damper 9 as a reaction force from the first internal end portion wall 541e. As described above, the front protrusion 92, the base portion 91, and the rear protrusion 93 of the damper 9 behave as an elastic body of the spring constant K as a whole, and thus a portion of the force f1 is consumed to elastically deform the elastic body of the spring constant K. In addition, a force f2 smaller than the force f1 is transmitted from the damper 9 to the inner column bracket 4, and a force having a magnitude substantially equivalent to that of the force f2 is applied to the shear pin 8 as a shear force f.

As illustrated in FIG. 26, when the force f1 greater than or equal to an allowed shear force fa of the shear pin 8 is applied to the inner column 51, the damper 9 decreases the shear force f transmitted to the shear pin 8 to be less than the allowed shear force fa. That is, even when the force f1 applied to the inner column 51 is larger than the allowed shear force fa of the shear pin 8, the shear force f applied to the shear pin 8 becomes smaller than the allowed shear force fa of the shear pin 8. A force fd illustrated in FIG. 26 is a force consumed to elastically deform the damper 9 (the elastic body having the spring constant K). In addition, when the damper 9 is elastically deformed, x3 illustrated in FIG. 26 becomes a value larger than x2 illustrated in FIG. 24. The shear force f becomes the force f2 having a peak at a point in time that is x=x3 in FIG. 26. However, thereafter, the position of the inner column 51 returns to an original position as the elastically deformed damper 9 is restored, and the shear force f becomes smaller. Therefore, in the present embodiment, even when the damper 9 collides with the first internal end portion wall 541e at a force greater than the allowed shear force fa of the shear pin 8 at the time of performing telescopic adjustment, cutting of the shear pin 8 is suppressed.

As described in the foregoing, the steering device 100 according to the present embodiment includes the inner column 51, the outer column 54, the outer column bracket 52, the inner column bracket 4, and the shear pin 8, and the damper 9. The inner column 51 is a cylindrical member that rotatably supports the input shaft 151 connected to the steering wheel 14 and has the first hole 51h. The outer column 54 has a cylindrical shape into which at least a portion of the inner column 51 is inserted, and has the first slit 541 formed by notching one end of the outer column 54 into which the inner column 51 is inserted. The outer column bracket 52 is fixed to the vehicle body-side member 13 to support the outer column 54 and tighten the outer column 54 together with the telescopic friction plate corresponding to the plate material (first telescopic friction plates 21). The inner column bracket 4 is supported by the telescopic friction plate (first telescopic friction plates 21), and has the second hole 43h. The shear pin 8 is located at a position across the first hole 51h and the second hole 43h, and detachably connects the inner column 51 and the inner column bracket 4. The damper 9 is attached to the inner column bracket 4, and faces the first internal end portion wall 541e corresponding to an internal wall of an end portion of the first slit 541 in the axial direction of the inner column 51.

Accordingly, in the steering device 100 according to the present embodiment, when excessive load is applied to the steering wheel 14, the load is transmitted to the inner column 51 through the input shaft 151, thereby moving the inner column 51 forward. On the other hand, the inner column bracket 4 supported by the first telescopic friction plates 21 does not move. For this reason, a shear force is applied to the shear pin 8. Thus, when the load exceeds the allowed shear force of the shear pin 8, the shear pin 8 is cut. When the shear pin 8 is cut, connection between the inner column 51 and the inner column bracket 4 is released. When the connection between the inner column 51 and the inner column bracket 4 is released, the inner column 51 is supported in the axial direction by a frictional force generated between the inner column 51 and the outer column 54. For this reason, the inner column 51 of the steering column 5 may move to a front of the vehicle body. In addition, even when the shear pin 8 is cut, the outer column 54 is continuously supported by the outer column bracket 52 which is fixed to the vehicle body-side member 13. Further, the inner column 51 is continuously supported by the outer column 54. For this reason, even when the shear pin 8 is cut, the steering column 5 does not fall. Therefore, even when a set value of a separation load at which the steering column 5 moves to the front of the vehicle (the allowed shear force of the shear pin 8) is lowered, the steering device 100 according to the present embodiment may suppress falling of the steering column 5 due to a malfunction.

Further, when a telescopic position becomes a forefront at the time of performing telescopic adjustment after operating the operating lever 53, the damper 9 comes into contact with the first internal end portion wall 541e. When a force is applied to the inner column 51 in a state in which the damper 9 comes into contact with the first internal end portion wall 541e, a reaction force from the first internal end portion wall 541e is applied to the damper 9. Accordingly, the damper 9 is elastically deformed, and thus a portion of the force applied to the damper 9 is consumed to elastically deform the damper 9. In addition, a smaller force than the force applied to the damper 9 is transmitted to the inner column bracket 4, and a shear force having a magnitude substantially equivalent to that of the force transmitted to the inner column bracket 4 is applied to the shear pin 8. For this reason, the shear force applied to the shear pin 8 becomes smaller than the force applied to the inner column 51. Therefore, the steering device 100 according to the present embodiment may suppress cutting of the shear pin 8 at the time of performing telescopic adjustment, and protect a separation mechanism.

In the steering device 100 according to the present embodiment, when load greater than or equal to the allowed shear force fa of the shear pin 8 is applied to the inner column 51, the damper 9 decreases a force transmitted to shear pin 8 to be less than the allowed shear force fa.

Accordingly, even when the damper 9 collides with the first internal end portion wall 541e at a force larger than the allowed shear force fa of the shear pin 8 at the time of performing telescopic adjustment, the steering device 100 may suppress cutting of the shear pin 8.

In the steering device 100 according to the present embodiment, the inner column bracket 4 includes the through-hole 47 that penetrates through the inner column bracket 4 in the radial direction of the inner column 51. The damper 9 includes the base portion 91 that faces the first internal end portion wall 541e, and the locking portion 99 that protrudes from the base portion 91 and penetrates through the through-hole 47.

Accordingly, a direction of a force applied to the damper 9 at the time of telescopic adjustment is different from a direction in which the damper 9 is locked with respect to the inner column bracket 4. For this reason, even when a force is repeatedly applied to the damper 9, the locking portion 99 is less likely to wear. Since a gap is less likely to be generated between the locking portion 99 and the through-hole 47, the locking portion 99 is less likely to fall out of the inner column bracket 4. Therefore, the steering device 100 according to the present embodiment may make the damper 9 less likely to fall out of the inner column bracket 4.

In the steering device 100 according to the present embodiment, the damper 9 includes the base portion 91 that faces the first internal end portion wall 541e, and a plurality of front protrusions 92 protruding from the base portion 91 in the axial direction of the inner column 51.

Accordingly, a gap (the depression 921) is formed between front protrusions 92. For this reason, when the damper 9 comes into contact with the first internal end portion wall 541e, the front protrusions 92 are easily and elastically deformed as compared to the base portion 91. That is, a spring constant of the front protrusion 92 as an elastic body becomes smaller than that of the base portion 91. In this way, since the damper 9 includes the front protrusion 92, the spring constant of which is small, a spring constant of the whole damper 9 easily becomes a value which is preferable to suppress cutting of the shear pin 8. That is, an impact absorbing capability of the damper 9 is improved. Therefore, the steering device 100 according to the present embodiment may more easily suppress cutting of the shear pin 8 at the time of performing telescopic adjustment.

In the steering device 100 according to the present embodiment, the inner column bracket 4 is disposed below the inner column 51, and includes the notch portion 46 formed by notching the surface that faces the inner column 51. The damper 9 is disposed in the notch portion 46.

Accordingly, the damper 9 is received in the notch portion 46, and thus a device formed by integrating the inner column bracket 4 and the damper 9 is miniaturized. In addition, the damper 9 is placed above the inner column bracket 4, and thus separation of the damper 9 from the inner column bracket 4 is suppressed.

In the steering device 100 according to the present embodiment, the damper 9 is synthetic rubber.

Synthetic rubber is a high-elastic material, and thus an elastic limit of the damper 9 becomes large. For this reason, even when a force is repeatedly applied to the damper 9, plastic deformation is less likely to occur in the damper 9. Therefore, the steering device 100 according to the present embodiment may suppress a possibility that a telescopic forefront position will be shifted from a predetermined position due to plastic deformation of the damper 9.

In the present embodiment, the telescopic friction plates (the first telescopic friction plates 21 and the second telescopic friction plate 22) are used to strengthen the tightening holding force with respect to the steering column 5. However, for example, a known means such as a gear engagement type may be alternatively used.

REFERENCE SIGNS LIST 12, 13 VEHICLE BODY-SIDE MEMBER
14 STEERING WHEEL
15 STEERING SHAFT
151 INPUT SHAFT
152 OUTPUT SHAFT
16 UNIVERSAL JOINT
17 LOWER SHAFT
18 UNIVERSAL JOINT
19 PINION SHAFT
100 STEERING DEVICE
21 FIRST TELESCOPIC FRICTION PLATE
22 SECOND TELESCOPIC FRICTION PLATE
31 ROD PENETRATING PORTION
33 ROD
4 INNER COLUMN BRACKET
43$h$ SECOND HOLE
46 NOTCH PORTION
47 THROUGH-HOLE
5 STEERING COLUMN
51 INNER COLUMN
51$h$ FIRST HOLE
52 OUTER COLUMN BRACKET
53 OPERATING LEVER
54 OUTER COLUMN
541 FIRST SLIT
541$e$ FIRST INTERNAL END PORTION WALL
542 SECOND SLIT
542$e$ SECOND INTERNAL END PORTION WALL
7 STOPPER
8 SHEAR PIN
9 DAMPER
91 BASE PORTION
92 FRONT PROTRUSION
93 REAR PROTRUSION
94 DOWNWARD PROTRUSION
95 PENETRATION PORTION
96 POSITIONING PORTION
97 GUIDE PORTION
99 LOCKING PORTION
BK SECTION
VB VEHICLE BODY

The invention claimed is:

1. A steering device comprising:
a cylindrical inner column that rotatably supports an input shaft connected to a steering wheel and has a first hole opened therein;
an outer column that has a cylindrical shape into which at least a portion of the inner column is inserted and has a slit formed by notching one end of the outer column into which the inner column is inserted;
an outer column bracket that is fixed to a vehicle body-side member, and supports the outer column, and tightens the outer column together with a telescopic friction plate corresponding to a plate material;
an inner column bracket that is supported by the telescopic friction plate and has a second hole opened therein;
a shear pin that is located at a position across the first hole and the second hole and detachably connects the inner column and the inner column bracket to each other; and
a damper that is attached to the inner column bracket and faces an internal end portion wall corresponding to an internal wall of an end portion of the slit in an axial direction of the inner column.

2. The steering device according to claim 1, wherein
the inner column bracket includes a through-hole penetrating through the inner column bracket in the radial direction of the inner column, and
the damper includes a base portion facing the internal end portion wall, and a locking portion protruding from the base portion and penetrating through the through-hole.

3. The steering device according to claim 1, wherein
the damper includes a base portion facing the internal end portion wall, and a plurality of protrusions protruding from the base portion in the axial direction of the inner column.

4. The steering device according to claim 1, wherein
the inner column bracket is disposed on a lower side of a vehicle body with respect to the inner column, and includes a notch portion formed by notching a surface facing the inner column, and
the damper is disposed in the notch portion.

5. The steering device according to claim 1, wherein the damper is synthetic rubber.

* * * * *